(12) United States Patent
Chelminski et al.

(10) Patent No.: US 11,598,891 B2
(45) Date of Patent: Mar. 7, 2023

(54) LOW FREQUENCY AND ULTRA LOW FREQUENCY SEISMIC SOURCE HAVING MULTIPLE OPERATING HEADS FOR MARINE EXPLORATION

(71) Applicant: SERCEL INC., Houston, TX (US)

(72) Inventors: Stephen Chelminski, Peterborough, NH (US); Joshua Ronen, Orinda, CA (US)

(73) Assignee: SERCEL INC., Houston, TX (US)

( * ) Notice: Subject to any disclaimer, the term of this patent is extended or adjusted under 35 U.S.C. 154(b) by 73 days.

(21) Appl. No.: 17/092,226

(22) Filed: Nov. 7, 2020

(65) Prior Publication Data

US 2021/0247532 A1     Aug. 12, 2021

Related U.S. Application Data

(60) Provisional application No. 62/971,694, filed on Feb. 7, 2020.

(51) Int. Cl.
*G01V 1/137* (2006.01)

(52) U.S. Cl.
CPC .................................. *G01V 1/137* (2013.01)

(58) Field of Classification Search
None
See application file for complete search history.

(56) References Cited

U.S. PATENT DOCUMENTS

| | | | | |
|---|---|---|---|---|
| 3,379,273 A * | 4/1968 | Chelminski | ............ | G01V 1/137 367/144 |
| 3,800,907 A * | 4/1974 | Chelminski | ............ | G01V 1/137 181/119 |
| 4,038,630 A * | 7/1977 | Chelminski | ............ | G01V 1/006 367/23 |
| 4,210,222 A * | 7/1980 | Chelminski | ............ | G01V 1/137 81/120 |
| 4,271,924 A * | 6/1981 | Chelminski | ............ | G01V 1/137 181/120 |
| 4,503,929 A * | 3/1985 | Farris | ...................... | G01V 1/137 181/118 |
| 4,599,712 A * | 7/1986 | Chelminski | ............ | G01V 1/137 181/118 |
| 4,648,479 A * | 3/1987 | Dolengowski | ......... | G01V 1/137 181/110 |
| 4,712,202 A * | 12/1987 | Chelminski | ............ | G01V 1/137 367/144 |

(Continued)

FOREIGN PATENT DOCUMENTS

GB         2225428 A  *  5/1990   ........... G01V 1/3861

*Primary Examiner* — Isam A Alsomiri
*Assistant Examiner* — Vikas Atmakuri
(74) *Attorney, Agent, or Firm* — Patent Portfolio Builders PLLC

(57) ABSTRACT

A seismic source having two or more operating heads with a firing chamber pressure vessel of compressed air for generating seismic oscillations at low and ultra-low frequencies (ULF) for marine seismic exploration. The multi-headed sound source increases low frequency signal in ranges from below 1 Hz to around 7 Hz to provide greater penetration of the seismic signal through complex overburden such as salt or basalt, improve velocity model building with methods such as Full Wave Inversion, improve the ability to build blocky reservoir models, and improve resolution by reducing side lobes.

22 Claims, 21 Drawing Sheets

(56) References Cited

U.S. PATENT DOCUMENTS

| | | | | |
|---|---|---|---|---|
| 4,715,023 | A * | 12/1987 | Otto | G01V 1/137 |
| | | | | 367/144 |
| 4,779,245 | A * | 10/1988 | Chelminski | G01V 1/137 |
| | | | | 181/120 |
| 4,834,210 | A * | 5/1989 | Kennedy | G01V 1/005 |
| | | | | 181/106 |
| 4,858,205 | A * | 8/1989 | Harrison | G01V 1/006 |
| | | | | 367/144 |
| 5,432,757 | A * | 7/1995 | Chelminski | G01V 1/137 |
| | | | | 181/120 |
| 5,475,188 | A * | 12/1995 | Cappelen | G01V 1/38 |
| | | | | 181/120 |
| 6,464,035 | B1 * | 10/2002 | Chelminski | G01V 1/135 |
| | | | | 367/75 |
| 8,223,591 | B2 | 7/2012 | Chelminski | |
| 8,279,711 | B2 * | 10/2012 | Nance | H04B 14/002 |
| | | | | 367/144 |
| 8,971,152 | B2 | 3/2015 | Chelminski | |
| 9,804,280 | B2 | 10/2017 | Chelminski | |
| 10,031,245 | B2 | 7/2018 | Chelminski | |
| 2010/0320027 | A1 * | 12/2010 | Chelminski | G01V 1/116 |
| | | | | 181/120 |
| 2013/0051180 | A1 * | 2/2013 | Chelminski | G01V 1/135 |
| | | | | 367/143 |
| 2014/0238772 | A1 * | 8/2014 | Chelminski | G01V 1/137 |
| | | | | 181/119 |
| 2015/0129349 | A1 * | 5/2015 | Chelminski | G01V 1/137 |
| | | | | 181/119 |
| 2017/0108599 | A1 * | 4/2017 | Chelminski | G01V 1/38 |
| 2019/0086563 | A1 * | 3/2019 | Chelminski | G01V 1/3861 |
| 2019/0339404 | A1 * | 11/2019 | Schneider | G01V 1/006 |

\* cited by examiner

SECTION A-A

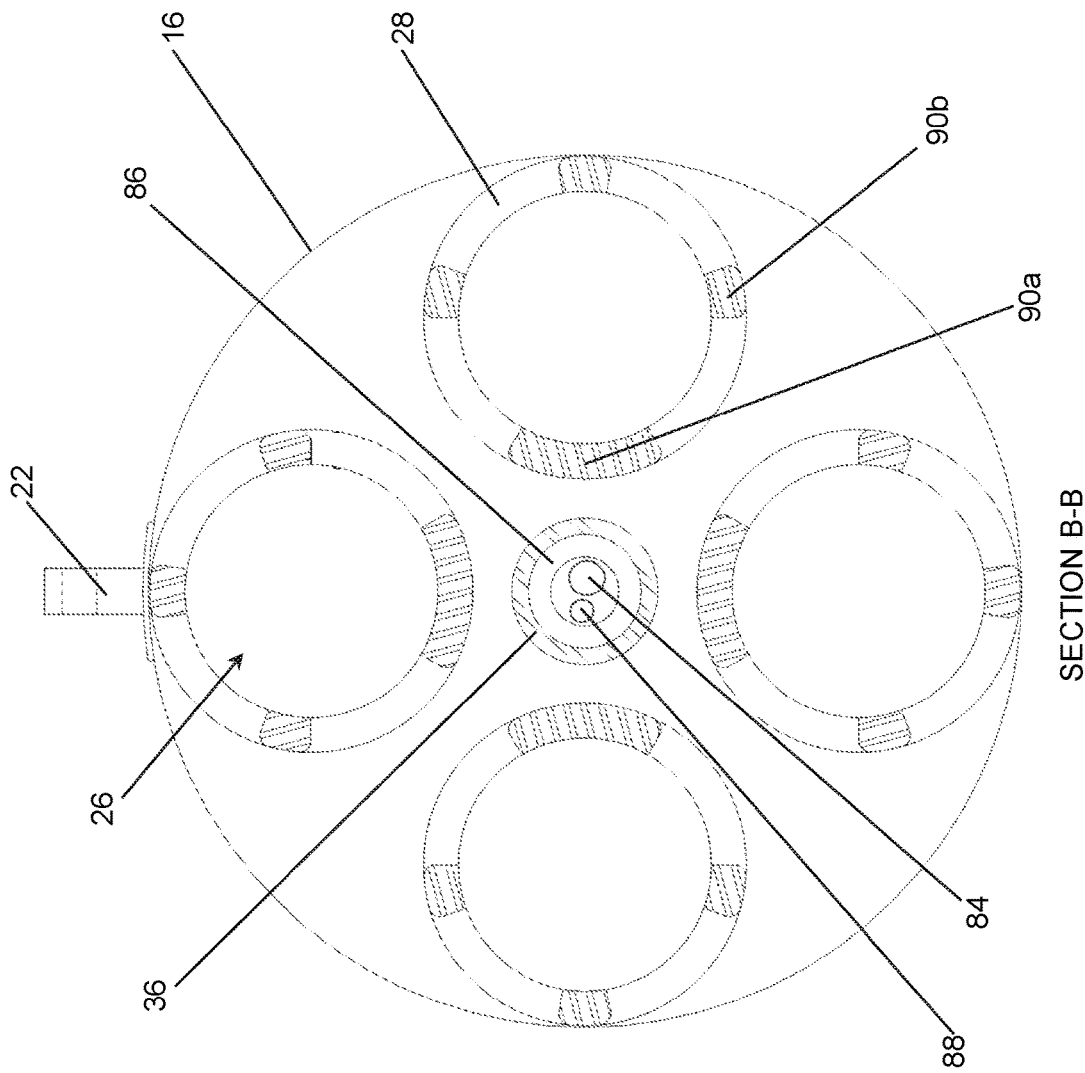

SECTION C-C

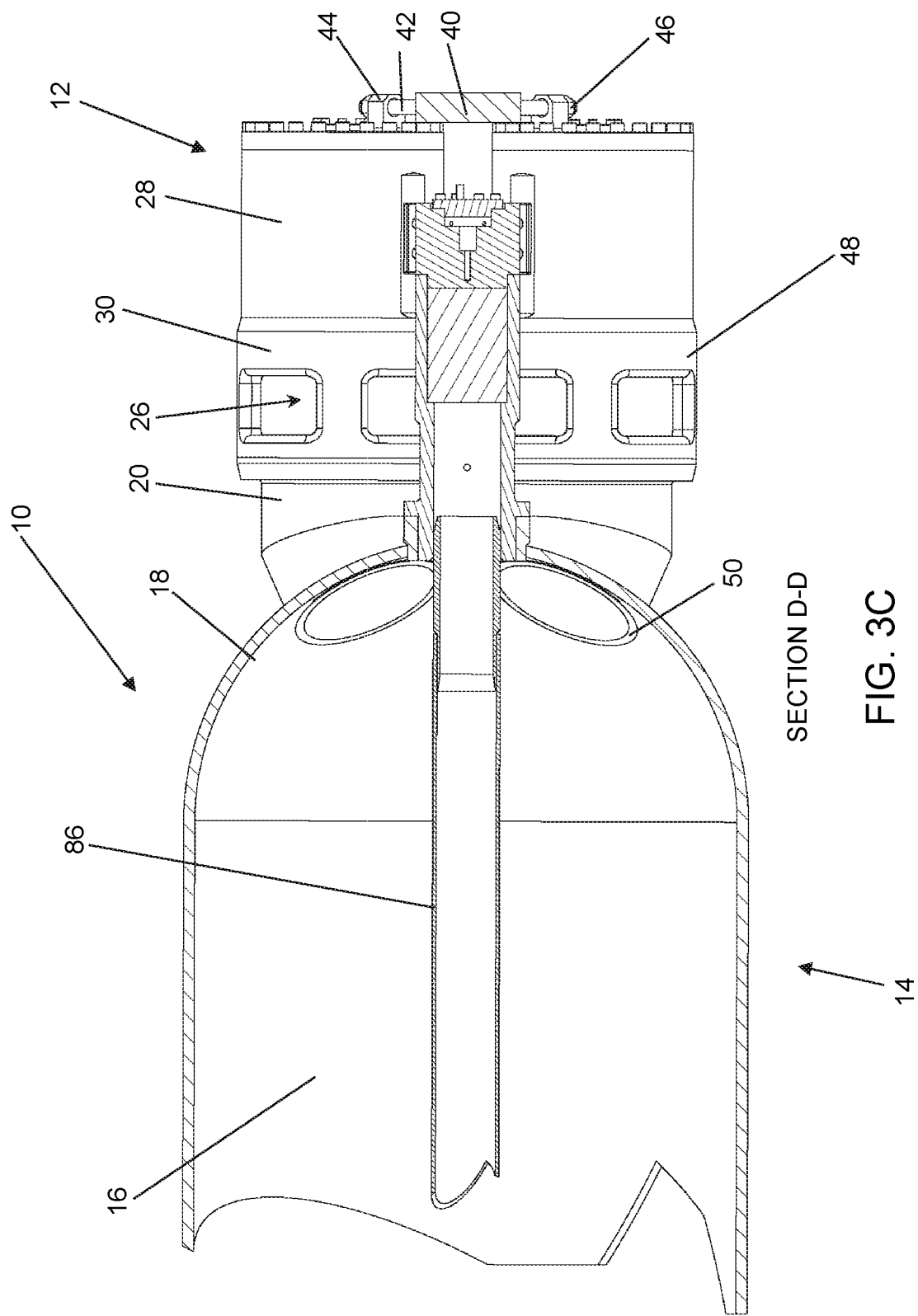
FIG. 3C  SECTION D-D

FIG 5B

LOW FREQUENCY AND ULTRA LOW FREQUENCY SEISMIC SOURCE HAVING MULTIPLE OPERATING HEADS FOR MARINE EXPLORATION

FIELD OF THE INVENTION

The present invention relates to a seismic source having two or more operating heads with a firing chamber pressure vessel of compressed air for generating seismic oscillations at low and ultra-low frequencies (ULF) for marine seismic exploration. The multi-headed sound source increases low frequency signal in ranges from below 1 Hz to around 7 Hz to provide greater penetration of the seismic signal through complex overburden such as salt or basalt, improve velocity model building with methods such as Full Wave Inversion, improve the ability to build blocky reservoir models, and improve resolution by reducing side lobes.

BACKGROUND OF THE INVENTION

In performing geophysical surveys using seismic sources, seismic source arrays or clusters are constructed to position two or more seismic sources within a radius of one-half meter to a meter distance to increase output performance of the array. The seismic sources of the prior art have a single operating head and a firing chamber, with the firing chamber holding a charge of gas under high pressure. A shuttle assembly having a firing piston and an operating piston positioned within the operating head or chamber retains the charge of pressurized gas within the firing chamber until firing. When the seismic source is fired by actuating a solenoid operated valve, pressurized air is released into the operating chamber, actuating the shuttle assembly to cause an abrupt discharge of pressurized air from the firing chamber through discharge ports and directly into the surrounding water creating an acoustic pulse and an oscillating bubble.

The conventional seismic source arrays of the prior art produce output frequencies generally between 4 Hz to about 1200 Hz with each seismic source within the array typically fired at compressed air pressures in the range of 2000 psi to 3000 psi. The initial pulse or primary pressure pulse produced by the array is less than 1.5 milliseconds (ms) of rise time to reach peak pressure which produces an abundance of high frequency components in the primary pressure pulse. These high frequency components are out of the range of interest for seismic analysis and therefore are not beneficial in the identification of subsurface geological structures. High frequencies may further be a source of damage to marine mammals and fish and may as well disturb the habitats and well-being of marine life. It is a further objective and advantage of the present invention that these undesirable high frequencies are eliminated.

Other seismic source arrays as described by the inventors in U.S. Publication No. 2019/0086563 produce low frequency and an ultra-low frequency (ULF) ranges using tuned pulse sources (TPS) that are different from conventional seismic sources and are operated at lower pressures of up to 1000 psi. The tuned pulse sources as described are bracketed together to be used in the seismic source array. The ULF cluster as described is designed and tuned to specific frequency ranges based on the number and energy output of the tuned pulse sources selected with the capability to fire all of the tuned pulse sources simultaneously or with a time delay as a phased cluster to increase overall energy output and enhance low frequency content. The present invention is unlike the arrays and clusters of the prior art and instead has a completely new approach to improve low frequency content and enable deeper imaging into the earth's crust and upper mantle.

The inventor, Stephen Chelminski, hereof has additional patents on air guns and tuned pulse source design such as U.S. Pat. Nos. 3,379,273, 4,038,630, 4,271,924, 4,599,712, 4,712,202, 4,779,245, 5,432,757, 8,223,591, and 8,971,152 and 9,804,280, and 10,031,245.

OBJECTS AND SUMMARY OF THE INVENTION

The present invention is a low frequency and an ultra-low frequency (ULF) seismic source to be used in place of a seismic source array. The seismic source is designed and tuned to specific frequency ranges and the desired energy output based on the number of operating heads selected and the volume of the pressure vessel used as the firing chamber. Each of the operating heads of the seismic source of the present invention may be fired simultaneously or with a time delay for a phased release to increase overall energy output and enhance low frequency content.

Characteristics of the output signal may also be preset by selecting specific diameters, lengths and volumes of the firing chamber pressure vessel and by selecting an increased number of operating heads to tune the rise time by reducing the slope of the output pulse. For example, in the present invention, embodiments of the seismic source having four operating heads and a volume of 80,000 cubic inches provides a rise time longer than 6 milliseconds, and an average rising slope of the primary pressure pulse of less than 3 bar-m/ms. A port exit area is created at a rate greater than or equal to 50 square centimeters per millisecond and includes an inner port structure that opens immediately when fired providing zero acceleration distance with increased coupling of the surface area of the compressed air from the firing chamber pressure vessel to water when fired.

In embodiments of the seismic source of the present invention, the diameter of the firing chamber pressure vessel may for example be ~60 cm (~24 inches) or greater to support two, four, six or more operational heads based on the requirements of the seismic survey with the diameter increasing to support additional operating heads. Each operating head has a firing piston sealing at the outer most edge of the operating head along the discharge ports to provide zero acceleration distance and have the firing piston immediately discharge the compressed air of the firing chamber through the discharge ports when fired. The operating heads are mounted to an output conduit that is formed with a slight bend through the semi-spherical end of the firing chamber to align the operating heads along the axis of the firing chamber and to reduce mechanical stresses on the firing chamber pressure vessel when fired. The discharge ports are of constant width along the length of the ports and face away from a central control module to direct air flow towards the discharge ports of the adjacent operating head or heads and into the surrounding water creating a large bubble as the compressed air is released. The central control module provides the electronics to control triggering a solenoid valve for firing each operating head simultaneously or in a rapid sequence to generate the oscillating bubble seismic pulse. An integrated communications module may further transmit the time instant when each operating head has fired to the exploration vessel and may further monitor the wave shape character of the oscillating bubble using a near field hydrophone. The temperature and pressure of the surrounding water may also be monitored through the integrated communications module to assist in determining the effect on the marine environment and depth where the seismic source having multiple operating heads is being operated.

Embodiments of the seismic source of the present invention further include a removable supply distribution valve for filling each operating chamber and the firing chamber pressure vessel separately. Embodiments of the distribution valve include an air release safety device using directional flow valves to prevent an erratic discharge of air from any operating head or the firing chamber pressure vessel when on deck or during deployment or retraction from the water which may cause damage and injury. Embodiments further include piping and valves to release air from each of the operating chambers separately and from the firing chamber. Embodiments of the seismic source of the present invention may operate at a range of pressures from 200 psi to 1000 psi and more preferably at pressures from 600 psi to 1000 psi.

It is an object and advantage of the invention to provide embodiments of a seismic source having multiple operating heads that increase low frequency output and reduce or eliminate harmful and unusable high frequencies.

It is an object and advantage of the invention to provide embodiments of a seismic source having multiple operating heads that can replace a seismic source array or cluster.

It is an object and advantage of the invention to provide embodiments of a seismic source having multiple operating heads which produce increased low frequency content in a range from below 1 Hz to 7 Hz.

It is an object and advantage of the invention to design embodiments of a seismic source having multiple operating heads to produce low frequency content within a specific range by selecting the number of operating heads and the diameter, length, and volume of the firing chamber pressure vessel for the desired energy output of the seismic source of the present invention.

It is an object and advantage of the invention to design embodiments of a seismic source having multiple operating heads to adjust output pulse characteristics by selecting a specific diameter, length and volume of firing chamber pressure vessel.

It is an object and advantage of the invention to provide embodiments of a seismic source having multiple operating heads that will produce more low frequency energy than conventional seismic source arrays.

It is an object and advantage of the present invention to produce embodiments of a seismic source having multiple operating heads that has no acceleration distance meaning that compressed air is released through the ports from each operating head that is fired immediately when the shuttle assembly disengages from the firing seal.

It is an object and advantage of the present invention to produce embodiments of a seismic source having multiple operating heads that releases compressed air directed at discharge ports of adjacent operating heads to form the seismic signal output as a large oscillating bubble.

It is an object and advantage of the present invention to provide embodiments of a seismic source having multiple operating heads which has rectangular discharge ports of constant width along the length of the ports providing large coupling of the surface area of the compressed air from the firing chamber pressure vessel to water when fired.

It is an object and advantage of the invention to provide embodiments of a seismic source having multiple operating heads with a port exit area for each operating head that is created at rates of greater than or equal to 50 cm$^2$/ms and a pulse rise time longer than 6 milliseconds.

It is an object and advantage of the present invention to provide embodiments of a seismic source having multiple operating heads that includes an integrated communications module with a near-field hydrophone sensor that is directed towards and at an equal distance from the discharge ports of each operating head.

It is an object and advantage of the present invention to provide embodiments of a seismic source having multiple operating heads that include a distribution valve assembly that separately fills each of the operating chambers and the firing chamber pressure vessel.

It is an object and advantage of the present invention to provide embodiments of a seismic source having multiple operating heads that includes an air release safety device assembly using directional flow valves to prevent an erratic discharge of the seismic source on deck or during deployment or retraction from the water which may cause damage and injury.

It is an object and advantage of the present invention to provide embodiments of a seismic source having multiple operating heads that include piping and valves to release air from each of the operating chambers separately from the firing chamber pressure vessel.

It is an object and advantage of the present invention to provide embodiments of a seismic source having multiple operating heads that include a central control module comprising a firing circuit and solenoid valve assembly for controlling the solenoid valves to fire each operating head simultaneously or in rapid sequence and an integrated communications module to obtain the timepoint when each operating heads is fired and data from pressure, temperature, and hydrophone sensors.

It is an object and advantage of the present invention to provide embodiments of a seismic source having multiple operating heads that includes a central control module which can be removed to have the firing circuit, solenoid valve assembly, integrated communications module replaced independently of the other without disturbing any wiring.

The present invention is related to a seismic source for marine exploration comprising a firing chamber configured to store compressed air; at least two operating heads each having discharge ports and a shuttle assembly configured to seal the firing chamber; and a control module configured to fire the seismic source by releasing the seal of the shuttle assembly and discharging the compressed air from the firing chamber to form an oscillating bubble seismic pulse from the release of air from the discharge ports of each of the at least two operating heads. In embodiments of the seismic source for marine exploration, the at least two operating heads comprise divider posts between the discharge ports; and the divider posts are of unequal dimensions to form discharge ports of different dimensions. In embodiments of the seismic source for marine exploration, the dimensions of the divider posts facing the axis of the firing chamber are larger in dimensions than the divider posts facing away from the axis of the firing chamber to form larger discharge ports facing away from the axis of the firing chamber than the discharge ports facing the axis of the firing chamber. Embodiments of the seismic source for marine exploration comprise a hub positioned along the axis of the firing chamber; and spokes attached to the hub and extending between the at least two operating heads, the spokes configured to prevent the operating heads from separating or stressfully vibrating when the seismic source is fired. In embodiments of the seismic source the control module is centrally located along a center axis of the firing chamber between the at least two operating heads.

Embodiments of the seismic source comprise a conduit pipe extending through the length of the firing chamber, the conduit pipe configured for conducting at least one electrical control cable and at least one air supply hose. The seismic source may further comprise at least one external terminal connector positioned at an end of the conduit pipe, the at least one external terminal connector configured for connection of at least one electrical cable from an exploration ship to the at least one electrical control cable of the conduit pipe. The seismic source may further comprise at least one external air supply connector positioned at an end of the conduit pipe, the at least one external air supply configured for connection of at least one air supply hose from an exploration ship to the at least one air supply hose of the conduit pipe. In embodiments of the seismic source for marine exploration the control module comprises an electrical distribution terminal configured to connect the control module to an electrical cable from the conduit pipe and to distribute power to the firing circuit of each of the at least two operating heads. Embodiments of the control module may further comprise a pneumatic distribution module configured to connect the control module to an air supply hose from the conduit pipe and to distribute air separately to each of the at least two operating heads and distribute air separately to the firing chamber. The control module may also comprise a magazine configured for locating a firing circuit and solenoid valves for each of the at least two operating heads. Embodiments of the magazine comprise cavities for canisters located at a radius around a center line of the magazine, the canisters configured for housing the firing circuits and solenoid valves for each of the at least two operating heads. In some embodiments, the control module comprises a communications module configured for monitoring and transmitting data comprising the timepoint of firing each of the at least two operating heads. The communications module may be configured for monitoring and transmitting data comprising at least one of readings from pressure sensors, temperature sensors, and hydrophone sensors. The control module of the seismic source may further be configured to seal each of shuttle assemblies of the at least two operating heads to the firing chamber simultaneously. The control module may also be configured to fill each of the at least two operating heads with compressed air prior to filling the firing chamber with compressed air. Embodiments of the seismic source comprise a vent configured to release compressed air from the firing chamber; and wherein the control module configured to vent the compressed air from the firing chamber while keeping compressed air within the operating heads at a pressure higher than the pressure within the firing chamber. The control module may be configured to fire all of the at least two operating heads simultaneously or to fire all or some of the at least two operating heads sequentially triggered at predetermined intervals. Embodiments of the seismic source for marine exploration further provide for the selection of the number of operating heads and the length, diameter and volume of the firing chamber to tune the characteristics of the seismic pulse. Embodiments comprise the operation of the seismic source using a firing sequence to have all or some of the operating heads fire at different points in time. Further embodiments of the seismic source comprise a time delay of between 1 and 50 milliseconds between the firing of each seismic source in the order of the firing sequence.

The objects, advantages and features of the present invention, which are believed to be novel, are set forth with particularity in the appended claims. These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

Specific embodiments of the invention have been chosen for the purpose of illustration and description, and are shown in the accompanying drawings, which form a part of this specification. The present invention, both as to its organization and manner of operation, together with further objects and advantages, may best be understood by reference to the following description, taken in connection with the accompanying drawings, wherein:

FIG. 2C is a cross-sectional view of FIG. 2A along Section B-B in an embodiment of the seismic source having multiple operating heads of the present invention;

FIG. 3C is a cross-sectional view of FIG. 3A along Section D-D in an embodiment of the seismic source having multiple operating heads of the present invention;

FIG. 5B is a side elevation view of an embodiment of the seismic source of the present invention showing one of the multiple operating heads and the control module;

DETAILED DESCRIPTION OF THE DRAWINGS

Figure 1:
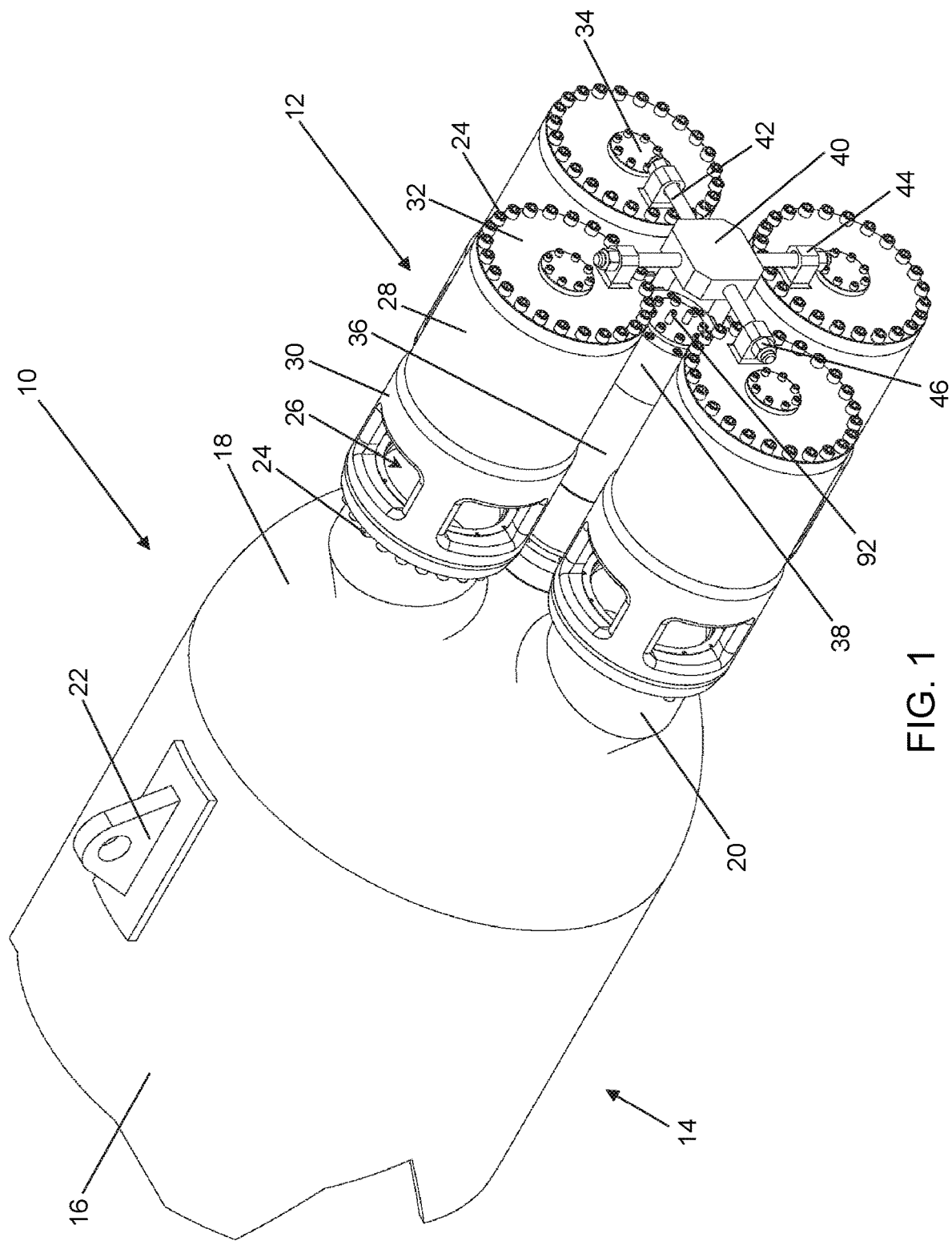
FIG. 1 is a perspective view of an embodiment of a seismic source having multiple operating heads in an embodiment of the present invention.

The seismic source 10 having multiple operating heads 12 as described herein is an improvement over seismic source arrays where a single sound source can be more easily deployed and operated. As shown in FIG. 1, the sound or seismic source comprises a large pressure vessel firing chamber 14 for the storage of compressed air at operating pressures that range from 200 psi to 1000 psi. The pressure vessel 16 of the firing chamber 14 may be oval or elliptical in shape with a semi-spherical head 18 with output pipes 20 that provide for the attachment of the operating heads 12. A tow hitch 22 or other attachment mechanism is welded or otherwise secured to the pressure vessel 16 to pull the seismic source 10 underwater behind an exploration ship for deployment. Each operating head 12 is attached to each output pipe 20 using a series of bolts 24 to align the discharge ports 26 of each operating head 12 at the end of each output pipe 20. The discharge ports 26 are formed through the operating head housing 28 and a cylindrical support 30 that is welded to the operating head housing 28. The operating head housing 28 is sealed with a cylindrical plate 32 and a cap 34 that is centered on each operating head 12. The operating heads 12 are radially spaced and preferably equidistant from a center point around which a tubular housing 36 holds the central control module 38. A centrally located strong steel hub 40 for securing strong threaded spokes 42 is centered between the operating heads 12 with strong mounting bosses 44 and nuts 46. The spokes 42 prevent the operating heads 12 from stressing or pulling each operating head 12 outwardly or against each other and help to reduce vibration of the operating heads as high-powered air blasts are converging around the operating heads 12 when the seismic source 10 fires.

Figure 2A:
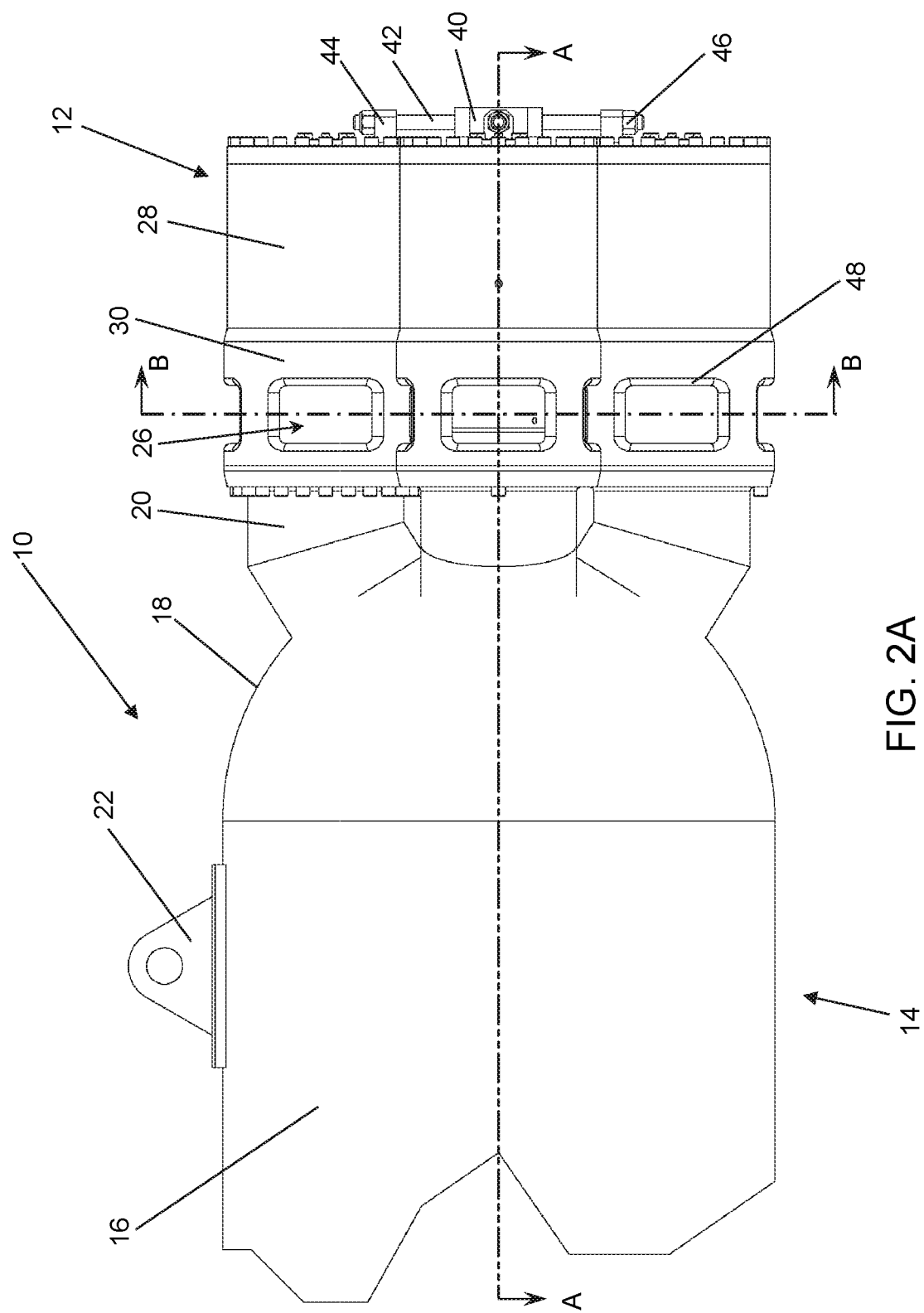
FIG. 2A is a side elevation view of the embodiment of the seismic source having multiple operating heads of FIG. 1.
Figure 2B:
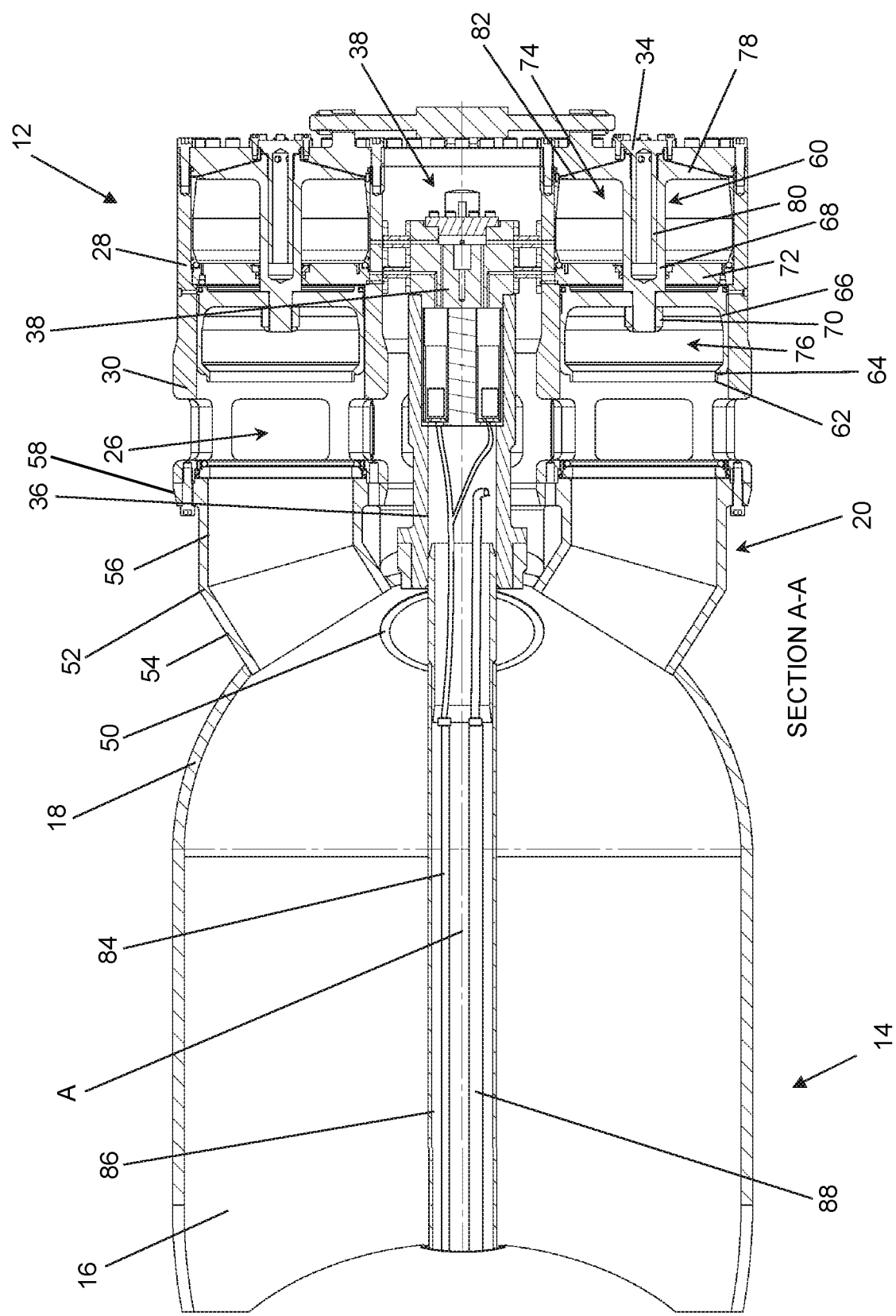
FIG. 2B is a cross-sectional view of FIG. 2A along Section A-A in an embodiment of the seismic source having multiple operating heads of the present invention.

A side elevation view of a rear portion of the firing chamber 14 and the operating heads 12 is shown in FIG. 2A. The diameter and length of the firing chamber 14 may be of any suitable dimensions to support the desired number of operating heads 12 with the dimensions and number of operating heads 12 being configurable based on the requirements of a particular seismic survey. The discharge ports 26 of each operating head 12 are large and rectangular in shape with rounded or contoured edges 48 along the housing 28 and cylindrical support 30 to reduce cavitation and have the compressed air from the firing chamber 14 exit freely through the discharge ports 26 when the seismic source 10 is fired. As shown in FIG. 2B, to provide further structural support to the seismic source 10 when firing and to have the attachment opening 50 of the output pipe 20 of the firing chamber 14 be circular, the output pipe 20 is formed with a bend 52 to extend the inner portion 54 of the output pipe 20 at an angle of between 30° and 65° with respect to the center axis A of the firing chamber 14. The inner portion 54 of the output pipe 20 mates with or extends through the semi-hemispherical head 18 of the firing chamber 14 to be welded to the pressure vessel 16. An outer portion 56 of the output pipe 20 is formed with a bolt circle 58 that is bolted to an operating head 12 along the discharge ports 26 to secure each operating head to the firing chamber 14.

As shown in the cross-sectional view of FIG. 2B, each operating head 12 has a shuttle assembly 60 that in a closed position has a firing seal ring 62 that seals the output pipes 20 of the firing chamber 14 preventing release of the compressed air of the pressure vessel 16. The firing seal ring 62 is affixed at the outer edge 64 of a cup shaped flange 66 that is attached to the firing piston 68 using a shuttle assembly nut 70. The firing piston 68 extends through a bulkhead 72 that separates and seals the operating chamber 74 from the air chamber 76 that the cup shaped flange 66 is installed within. An operating flange 78 extends out in the shape of a disk from the opposing end of the firing piston 68 within the operating chamber 74. The firing piston 68 runs along a bearing rod assembly 80 extending from the operating head cap 34 that provides for the firing piston 68 to move freely. Near the outer edge of the operating flange a groove 82 is formed. The firing of the seismic source 10 for each operating head 26 is triggered by the control module 38 that receives electric power through electrical cables 84 that run through a conduit pipe 86 that extends through the firing chamber 14. The conduit pipe 86 may also provide air supply hoses 88 to supply and set the air pressure within each operating chamber 74. The conduit pipe 86 is welded at each end to the pressure vessel 16 of the firing chamber 14 and sealed using terminal connectors. In an open position after firing as shown, the firing piston 68 is moved from left to right in this example to pull the firing seal ring 62 away from the output pipe 20 and rapidly release the compressed air from within the pressure vessel 16 of the firing chamber 14 through the discharge ports 26 to form the oscillating bubble seismic signal.

In a cross-sectional view through the discharge ports 26 towards the firing chamber 14 as shown in FIG. 2C, the divider posts 90 structurally support the discharge ports 26. In embodiments of the seismic source 10, the divider posts 90 may be of any dimension depending on the number and dimensions of the operating heads 12 and the diameter of the firing chamber 14 to have adequate spacing and distance between each of the operating heads 12 to form the oscillating bubble of the output signal. Distances between the operating heads 12 may be less than one meter and preferably between ½ meter and a meter for bubble formation. The divider posts 90 may also be of different dimensions with some posts 90a along the central portion of the discharge ports large to divert the high-powered air outwards and reduce stress or vibration on the operating heads 12. The outer discharge posts 90b are smaller in dimension in order to not impede air flow or create cavitation which may produce high frequencies as the air is discharged.

Figure 3A:
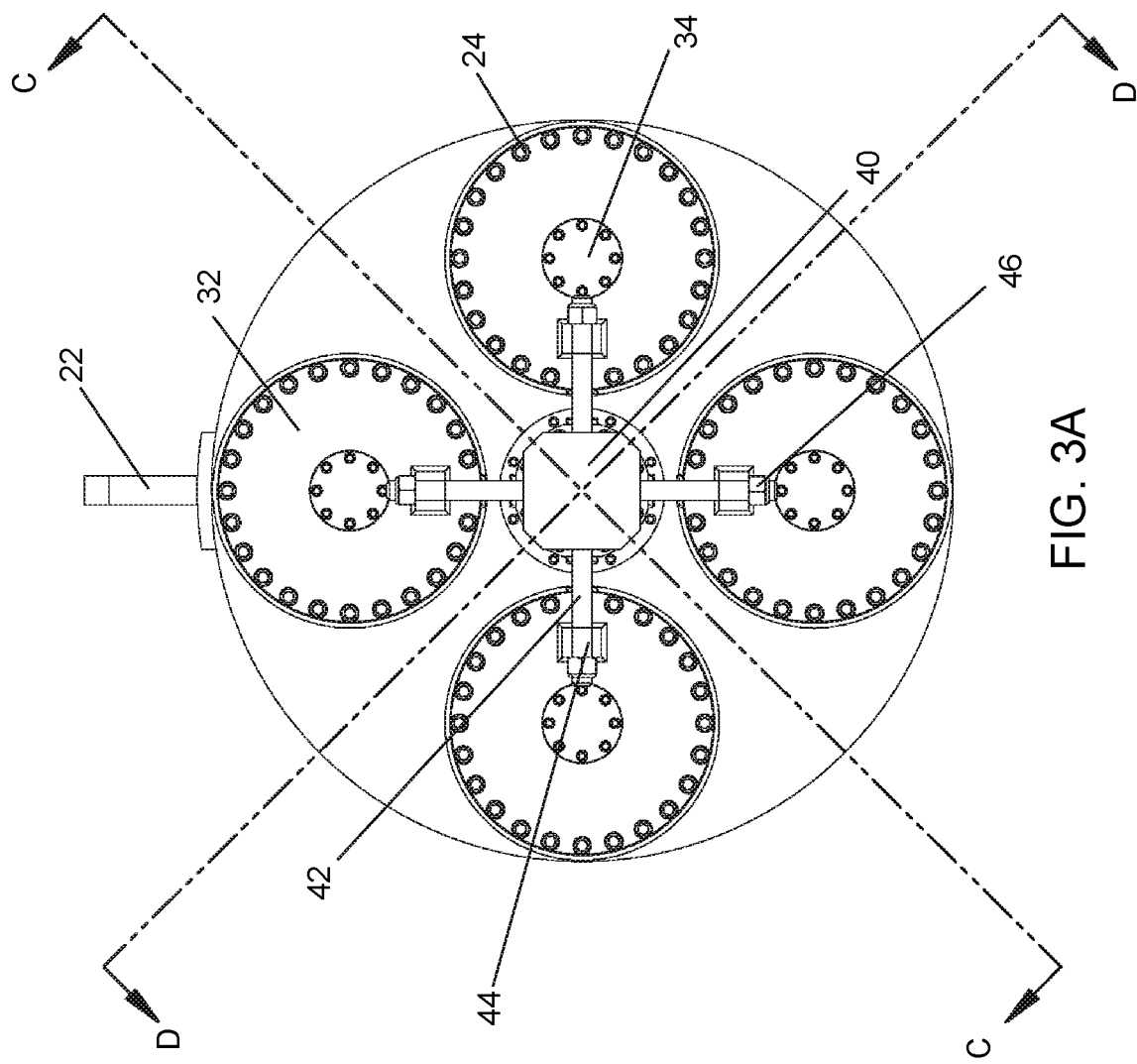
FIG. 3A is an end view of an embodiment of the seismic source of the present invention showing the multiple operating heads.
Figure 3B:
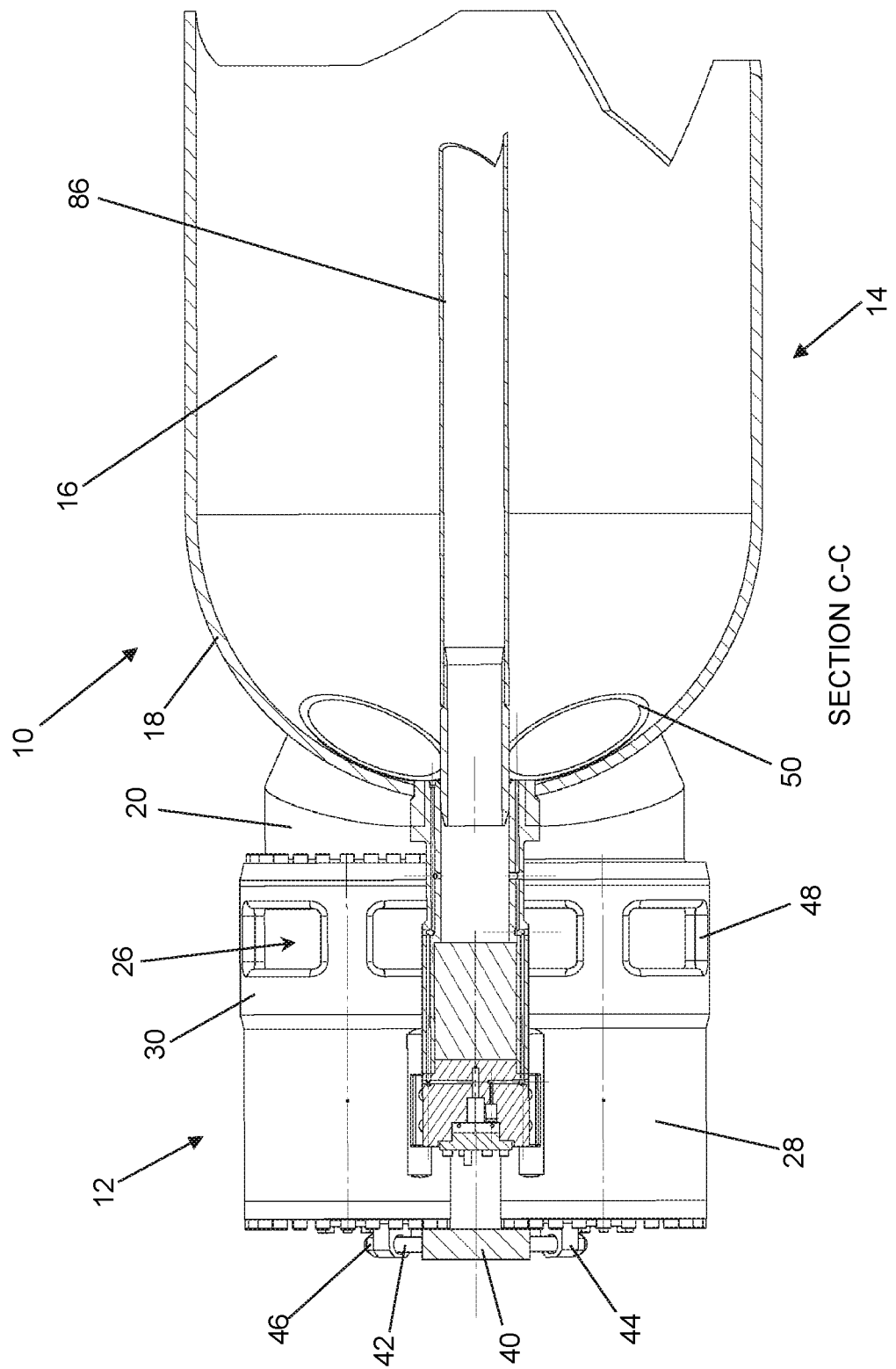
FIG. 3B is a cross-sectional view of FIG. 3A along Section C-C in an embodiment of the seismic source having multiple operating heads of the present invention.

An end view showing the cylindrical plates 32 and caps 34 of the operating heads 12 is shown in FIG. 3A with the bolt circles that seal the operating chamber 74 of each operating head 12. While any number of operating heads 12 may be installed to an adequately sized firing chamber 14, the operating heads are arranged in a way to be equidistant from the center point at the axis of the firing chamber 14 to properly balance the seismic source 10 when towing and firing. The steel hub 40 are spokes 42 are adequately dimensioned to secure the operating heads 12 and reduce vibration and the pulling of each operating head 12 when firing. The end cap 34 may provide access to the operating chamber 74 and may include a vent to release pressurized air from the operating chamber 74 to prevent undesired triggering of the seismic source 10. In FIG. 3B and FIG. 3C sectional views through section C-C and section D-D of FIG. 3A are shown representing the seismic source 10 in an embodiment with an even number, four in this example, of operating heads 12 which provides a mirror image where each operating head is radially spaced and positioned at an equal distance from the center axis A of the firing chamber 14.

Figure 4:
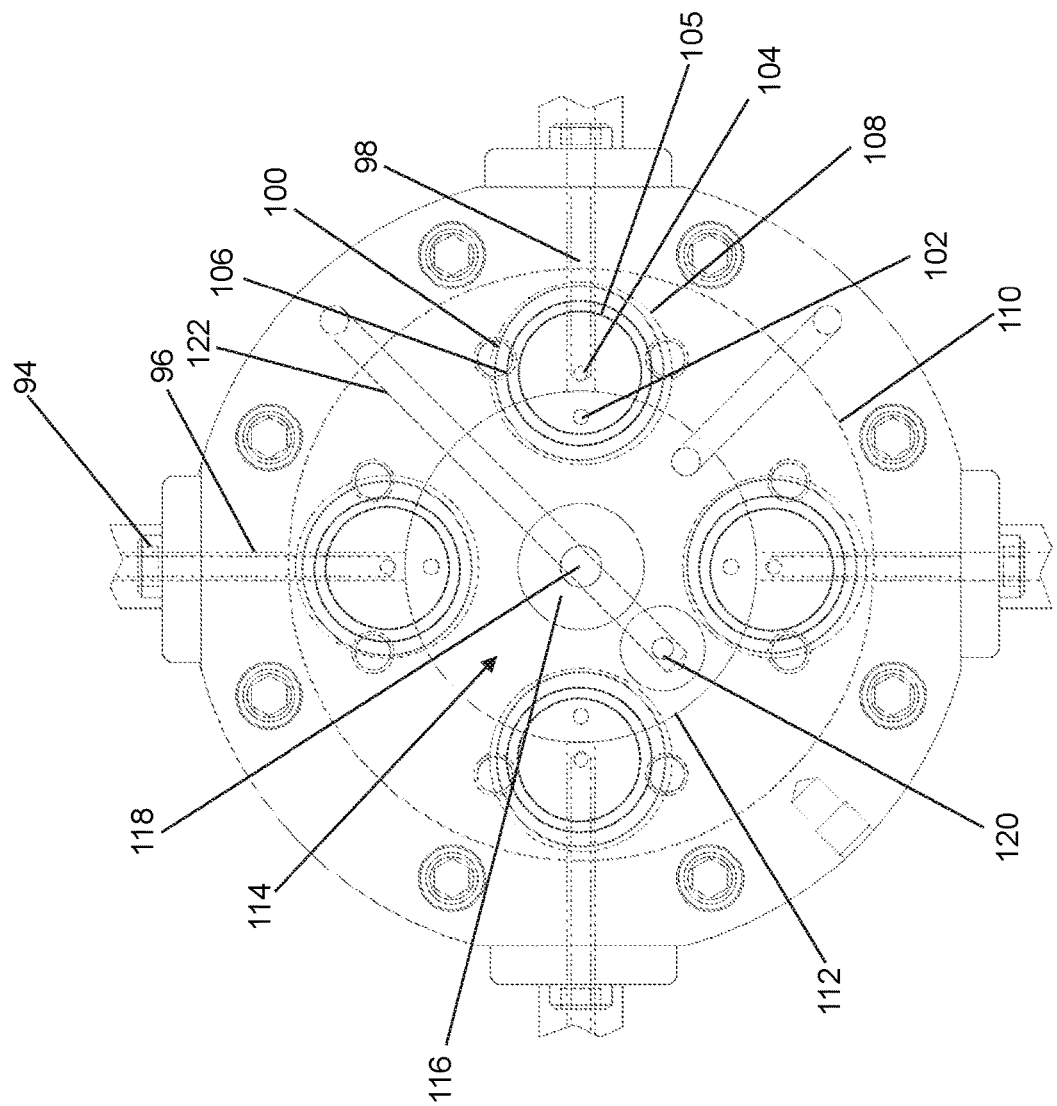
FIG. 4 is an end view of an embodiment of the control module that is positioned centrally between the operating heads in seismic source of the present invention.

The control module 38 is positioned centrally between the operating heads 12 along the center axis A of the firing chamber 14. In the end view shown in FIG. 4 the control module cap 92 shown in FIG. 1 is removed and the internal passages for air and electrical cabling are shown in dotted lines. For each operating head 12 a fitting 94 securely mounts and supports an upper air supply line 96 shown as the two outer dotted lines that is used to fill the operating chambers 74 and a trigger line 98 the two inner dotted lines that is the air passage from the solenoid valve 100 used to fire the seismic source 10. An air input trigger passage 102 to the solenoid valve 100 and the air output trigger passage 104 out from the solenoid valve 100 is shown. An integrated communications module 105, the firing circuit 106 and the solenoid valve 100 for each operating head 12 are placed within a waterproof cannister 108 within the control module 38 for protection of the components. The integrated communications module 105 may be connected to pressure sensors to monitor pressure within the operating chamber 45 and firing chamber 52 or temperature sensors to measure surrounding water temperature, or onboard hydrophones to measure the seismic pulse. The communications module 105 may also be connected to a time break transducer 109 installed at the air trigger passage 111 to each operating chamber 74 that measures a pressure spike when the seismic source 10 is fired providing the timepoint of firing to the integrated communications module 105. Based on measured timepoints for each operating head 12 the signals to the firing circuit can be programmed to fire all operating heads 12 at the same timepoint simultaneously or in a rapid sequence to form the oscillating bubble seismic pulse. The cannister 108 for each operating head 12 is slid into a magazine 110 that provides an electrical connection and aligns the solenoid valve 100 with the air input 102 and air output 104. For repair the cannister 108 is removed from the magazine 110 and either the integrated communications module 105, the firing circuit 106 or solenoid valve 100 may be removed from the canister 108 to be repaired or replaced. When the cap 92 is removed an opening 112 is provided to access the control module 28. In the center of the control module 38 is an air distribution module 114 that provides for filling each of the operating chambers 74 and maintains the pressure of the operating chambers 74 above the firing chamber 14 pressure to prevent misfiring of the seismic source 10 that can cause serious injury or death. The air distribution module 114 comprises an air distribution pocket 116, a check valve 118 and a minimum pressure relief valve 120 and a fill line 122 that extends from the firing chamber 14 to supply air to the air distribution module 114.

The electrical cables 84 coming directly from the exploration ship extend through the conduit pipe 86 and the tubular housing 36 that is sealed and protects the cables 84 and air supply line 88 from the burst of high-powered air discharged when firing the seismic source 10. Air guns of the prior art having cable conduits along the outer portion of the firing chamber and operating head close to the discharge ports where the effect of the heavy discharge of air can cause damage to these connections. The electrical cables 84 are connected to a terminal 124 at the base of each opening in the magazine 110. A multi-cable connector 126 at the base of the canister 108 provides the electrical connection to the firing circuit 106 and solenoid valve 100 and when the canister 108 is pulled out of the magazine 110 the electrical connector 126 is pulled out of the terminal 124 to allow for the repair or replacement of the firing circuit 106 or solenoid valve 100.

The air distribution module 114 of control module 38 provides faster filling and venting of the operating chambers 12 and pressure vessel 16 of the firing chamber 14. The operating chambers 74 are filled through the supply line 96 that is supplied with air from the air distribution pocket 116 formed adjacent to the check valve 118. The air distribution pocket 116 also supplies the air input trigger passage 102 to the solenoid valve 100. When the seismic source 10 is fired, the firing circuit 106 triggers to open the solenoid valve 100, releasing air from the solenoid valve 100 through the air output trigger passage 104 and the trigger line 98 to the operating chamber 74. The air supply line 122 supplies air from the pressure vessel 16 of the firing chamber 14 through the check valve 118 to the air distribution pocket 116 and the check valve 118 prevents air from being drawn out of the air pocket 116 or operating chambers 74 when firing or venting the pressure vessel 16 of the firing chamber 14. Additionally, the minimum pressure relief valve 120 maintains the pressure of the operating chambers 74 above the firing chamber pressure 14 by receiving air from the additional air supply line 88 that supplies compressed air directly from the exploration ship. The air supply line 88 feeds through the relief valve air passage 128 to the minimum pressure relief valve 120. In order to prevent the operating chamber 74 pressure from dropping to a pressure below the firing chamber pressure 14, the air supply from the exploration ship through the air supply line 88 is set and maintained at a pressure that is higher than the pressure vessel 16 of the firing chamber 14 and thereby maintaining the air distribution pocket 116 and operating chambers 74 at a higher pressure than the firing chamber 14. Therefore when the operating chambers 74 have been pressurized through check valve 118, the air distribution pocket 116 and the operating chamber fill line 96 the volume of compressed air within the operating chamber 74 has no passage to escape except through the operating chamber relief valve 130 because the minimum pressure relief valve 120 remains closed, the check valve 118 remains closed and operating flange 78 is sealed to the bulkhead 72 by the operating seal 132. For example, after use at sea when the seismic source 10 is to be returned to the deck of the exploration ship, the pressure vessel 16 of the firing chamber 14 must be vented of high-pressure air so that the seismic source cannot trigger and fire when out of water. As the pressure vessel 16 of the firing chamber 14 is being vented an air pressure of at least 125 psi or higher is maintained from the air supply of the exploration ship supplied to the minimum pressure relief valve 120 preventing the seismic source 10 from firing inadvertently. Additionally, for initial filling of the operating chambers 74 with compressed air a manual fill line 134 is accessible through the cap 92 of the control module 38. A vent line 136 for manually releasing pressure from the operating chambers 74 is also provided.

Figure 5A:
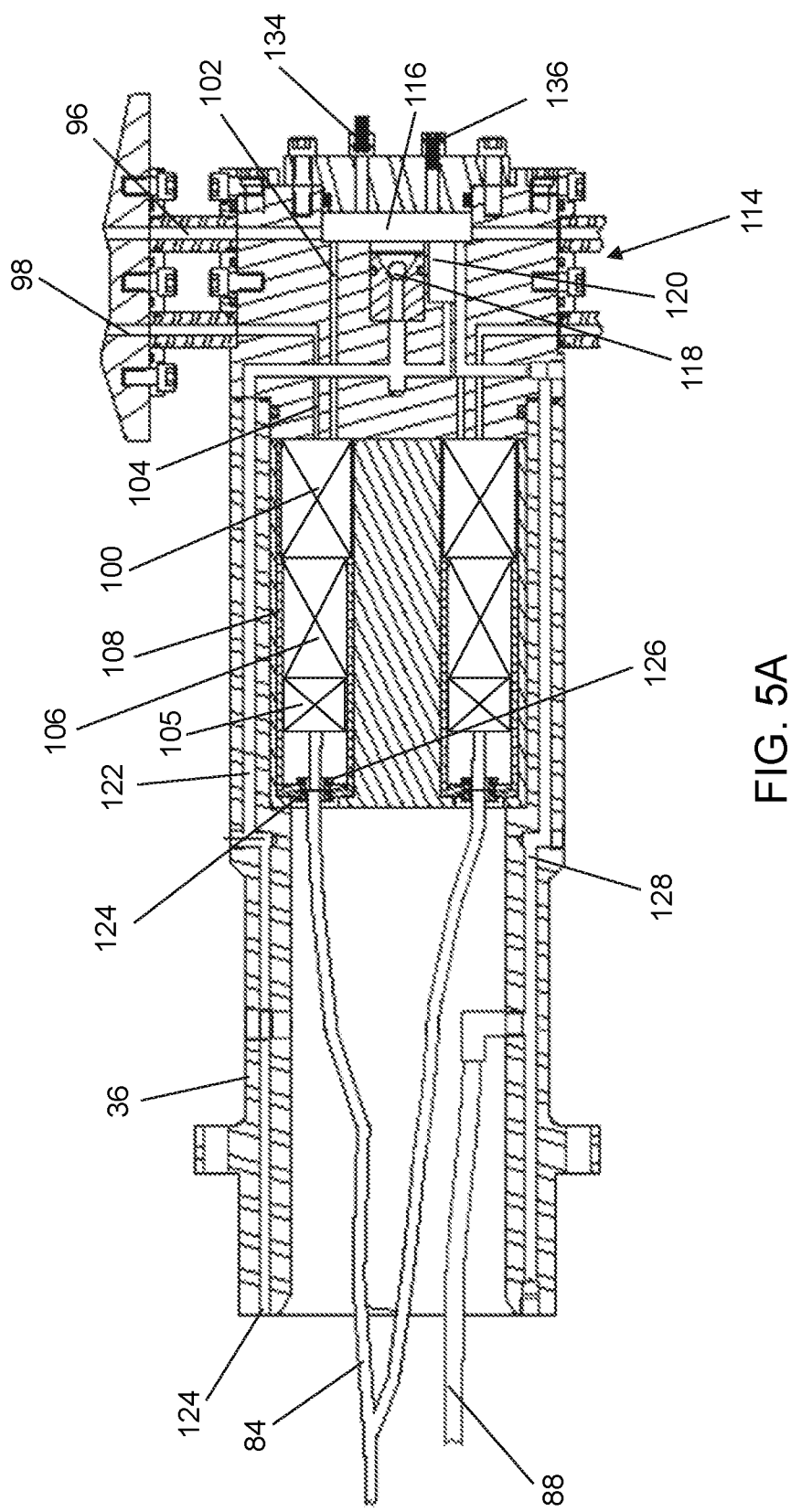
FIG. 5A is a side elevation view of an embodiment of the control module in an embodiment of the seismic source of the present invention having multiple operating heads.
Figure 5B:
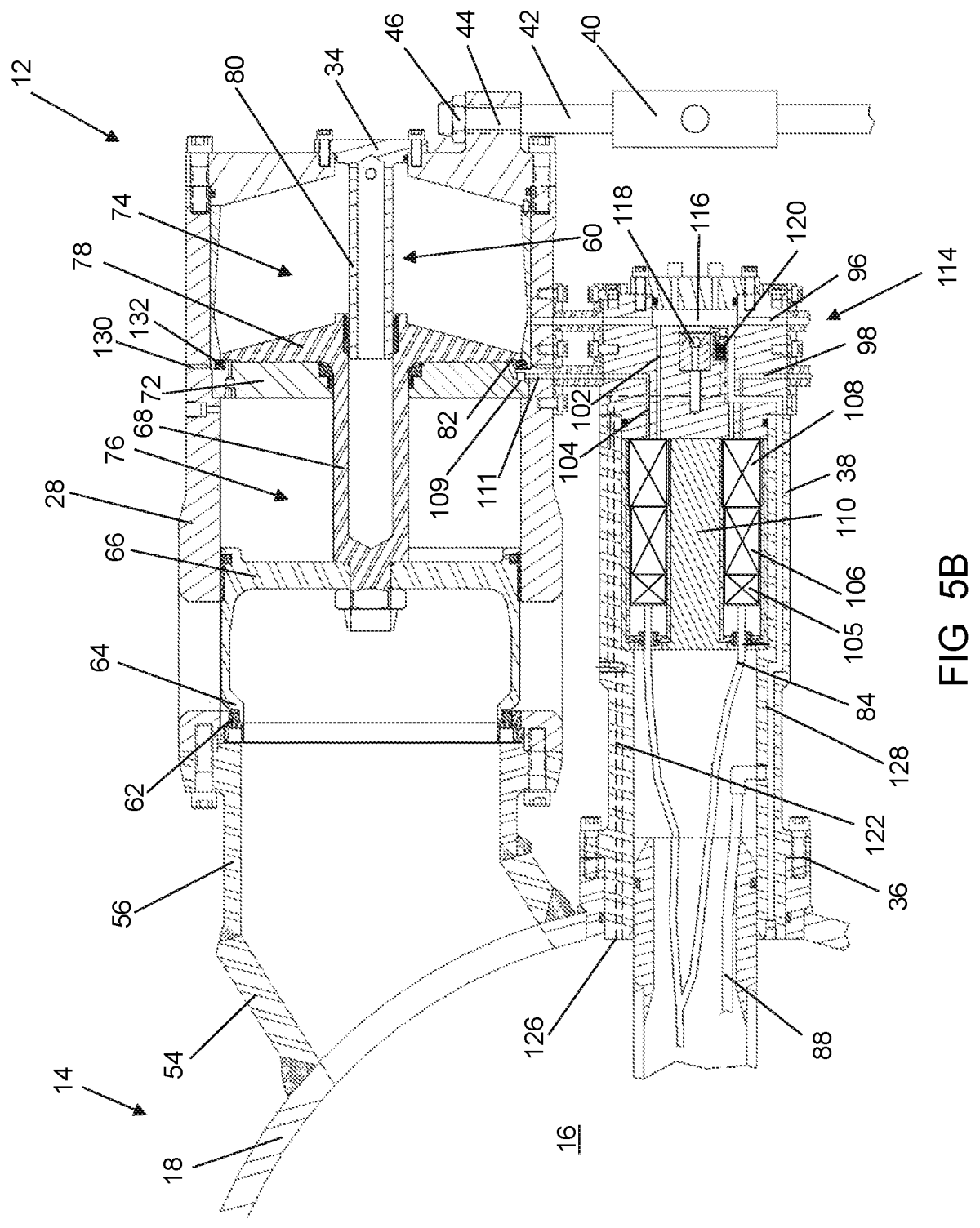

In operation, as shown in FIG. 5B, showing the connection of the control module 38 to one operating chamber 74, the air pressure within the pressure vessel 16 of the firing chamber 14 is set at an operating pressure of between 200 psi to 1000 psi and preferably at 1000 psi. The air supply line 122 from the firing chamber 14 supplies the operating chamber 74 with compressed air at the operating pressure forcing the shuttle assembly 60 to a closed position with the operating flange 78 sealed against the operating seal 132 at the bulkhead 72. Air also flows through the air input trigger passage 102 to the solenoid valve 100 in preparation for firing of the seismic source 10. An electrical signal is sent from the exploration ship triggering one or all of the firing circuits 106 to energize the solenoid valve or solenoid valves 100 and actuate the solenoid valve 100 to release air into the air output trigger passage 104 through trigger line 98 out of the control module 38 and through the operating chamber trigger air passage 111 to release air into the operating flange groove 82 along the outer edge of the operating flange 78 unbalancing the pressure on each side of the operating flange 78 causing firing piston 68 of the shuttle assembly 60 to rapidly move along the bearing rod assembly 80 and pulling the firing seal ring 62 of the cup shape flange 66 away from the output pipe 20 and immediately discharging the compressed air of the pressure vessel 16 of the firing chamber 14 to form the oscillating bubble seismic pulse. As the compressed air enters within the operating chamber 74 a pressure spike is measured by the time break transducer passage 109 producing a signal to the integrated communications module 105 that the seismic source 10 has fired. When the compressed air from the firing chamber 14 is fully released, the shuttle assembly 60 quickly moves back to a closed position sealing the operating flange 78 to the bulkhead 72.

Figure 6A:
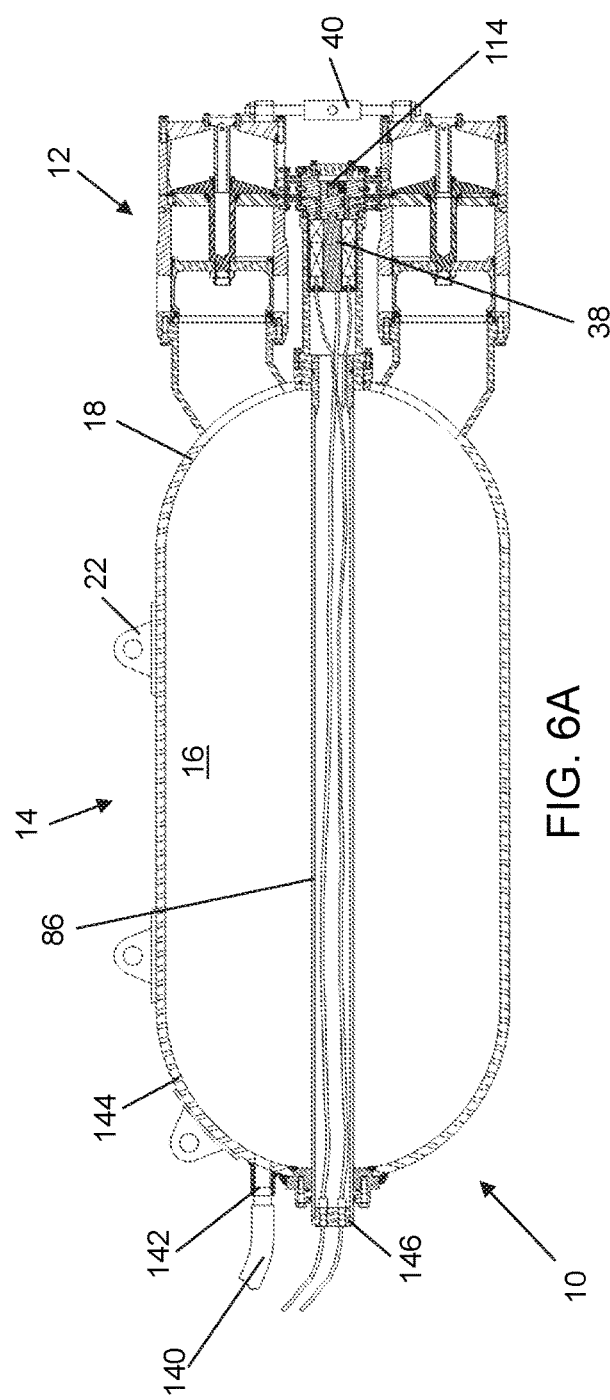
FIG. 6A is a cross-sectional view of an embodiment of the seismic source having multiple operating heads with the firing chamber pressure vessel.
Figure 6B:
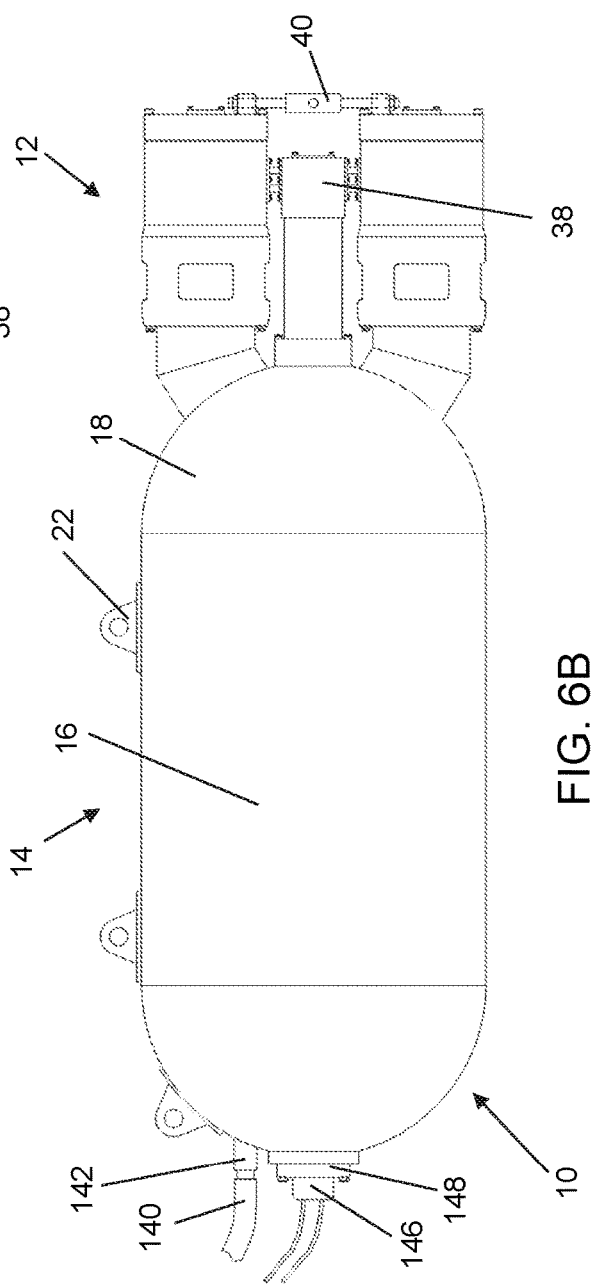
FIG. 6B is a side elevational view of an embodiment of the seismic source having multiple operating heads with the firing chamber pressure vessel.
Figure 7:
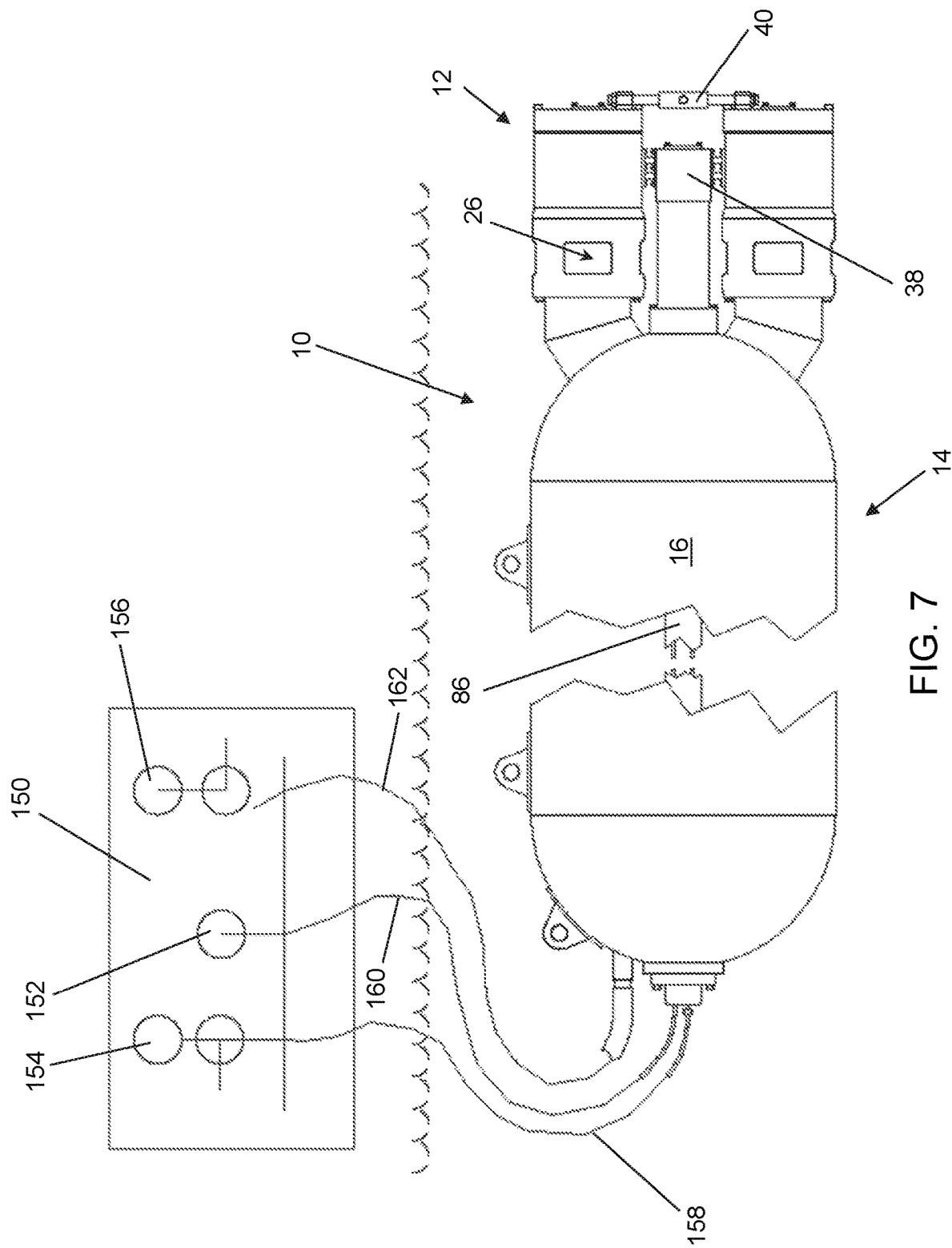
FIG. 7 is an illustration of an embodiment of the seismic source having multiple operating heads showing the electrical wiring and air supply hose connections to an exploration ship's control system.
Figure 8:
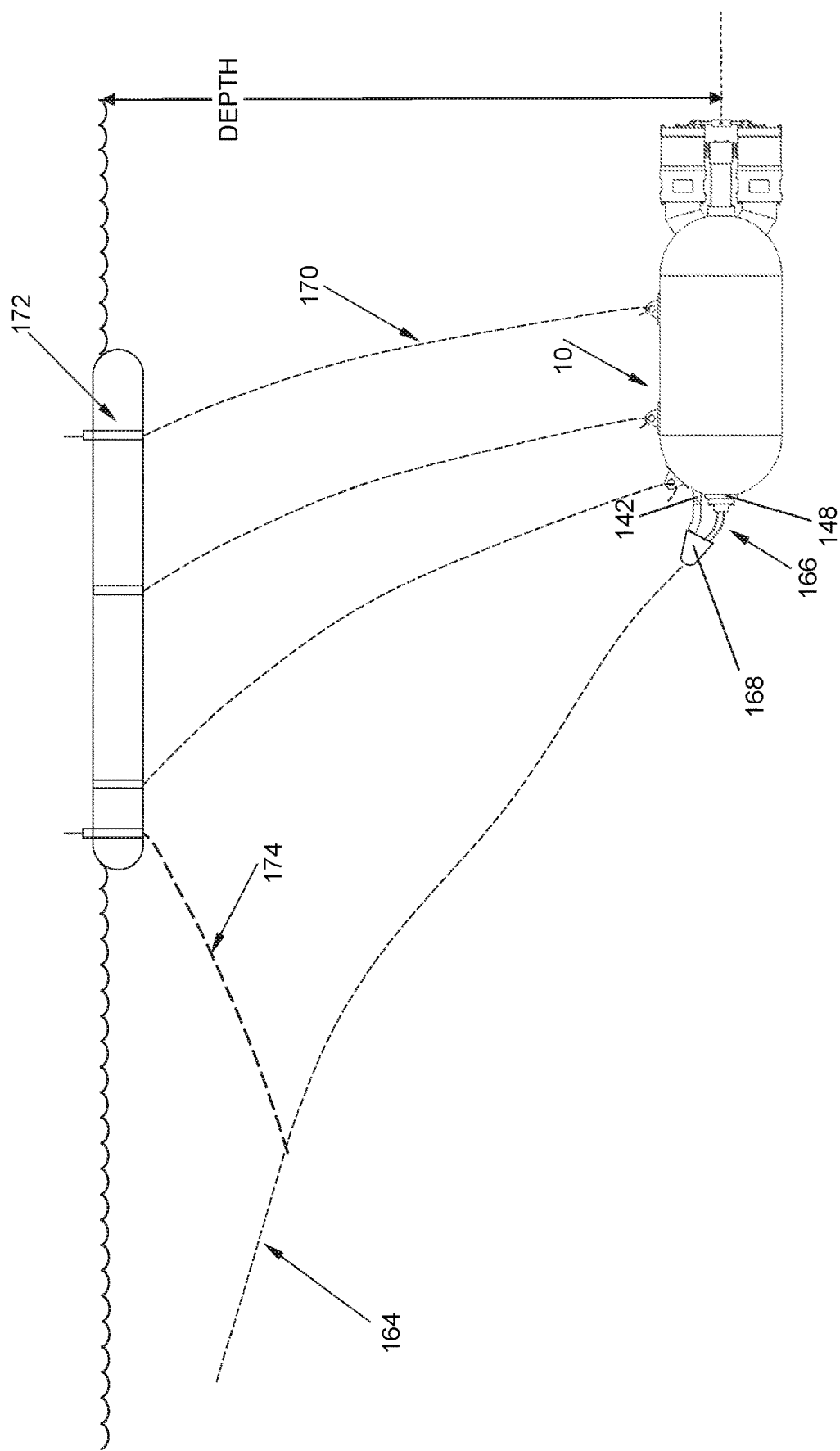
FIG. 8 is an embodiment of a seismic source having multiple operating heads with a suspension float for towing the seismic source having multiple operating heads behind a vessel.

As shown in FIG. 6A, after firing, the pressure vessel 16 of the firing chamber 14 is refilled with compressed air from the exploration vessel through hose 140 connected to a port 142 positioned on the forward semi-spherical head 144 of the firing chamber 14. After filling to an operating pressure of 1000 psi, all or any number of the operating heads 12 may again be triggered upon command to fire the seismic source 10. A connector terminal 146 for attachment of the electric control cables from the exploration ship caps the end of the conduit pipe 86. A terminal plug 148 seals the conduit pipe 86 as shown in FIG. 6B. The body of the pressure vessel 16 may be cylindrical with semispherical heads 18 and 142 of smooth curvature for easy towing underwater behind an exploration ship. As shown in FIG. 7, the pressure vessel 16 of the firing chamber 14 may be any length, diameter and volume and based on the dimensions of the pressure vessel 16 of the firing chamber 14 and the survey requirements, any number of operating heads 12 may be configured to produce the signal strength and characteristics desired for the seismic pulse. The centrally located steel hub 40 strongly holds the operating heads 12 in a fixed configuration that sets a specific distance between the discharge ports 26 to form a much more spherical bubble with sufficient energy and low frequency content to provide greater penetration particularly through basalt and sub-basalt structures that were previously difficult to survey. The exploration ship supplies a control distribution panel 150 that provides the electronic controls 152 to fire all operating heads 12 or fire one or more operating heads 12 in rapid secessions using programmable sequences to determine the order of firing. Air compressor controls 154 maintain the minimum air pressure at the relief valve 120 and other air compressor controls 156 refill the pressure vessel 16 after firing. The electrical cables 158 distribute power to the seismic source and the air hoses 160 and 162 supply compressed air at the different pressures to the relief valve 120 and the firing chamber 14. As shown in FIG. 8, the electrical cables 158 and air supply hoses 160 and 162 from the exploration ship may be bundle in an umbilical cable 164 that is connected to a cable harness 166 of the seismic source 10. The cable harness 166 is connected to the terminal plug 148 of the conduit pipe 86 and the air supply port 142. At the other end the cable harness 166 is connected to a bell housing 168 that is attached to the umbilical 164 that provides the compressed air and electrical power from the exploration ship. The seismic source 10 is attached to suspension chains 170 that are suspended from a suspension float 172. A guideline 174 is suspended from the float 172 and attached to the umbilical 164. The seismic source having multiple operating heads 12 can then be suspended at various depths for firing.

Figure 9:
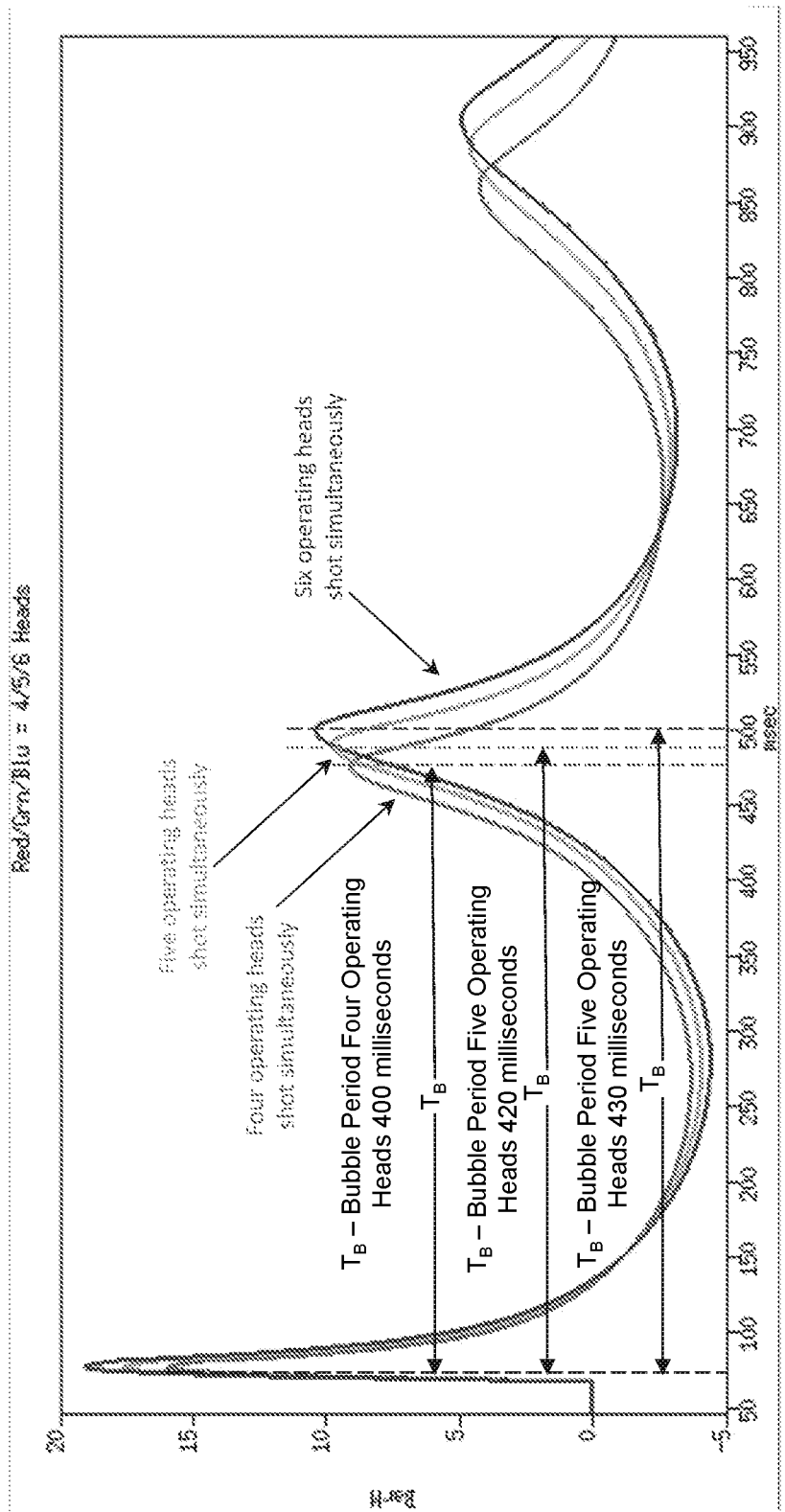
FIG. 9 is an embodiment of signatures from seismic sources of the present invention with the first with four operating heads, the second with five operating heads, and the third with six operating heads.
Figures 10A, 10B:
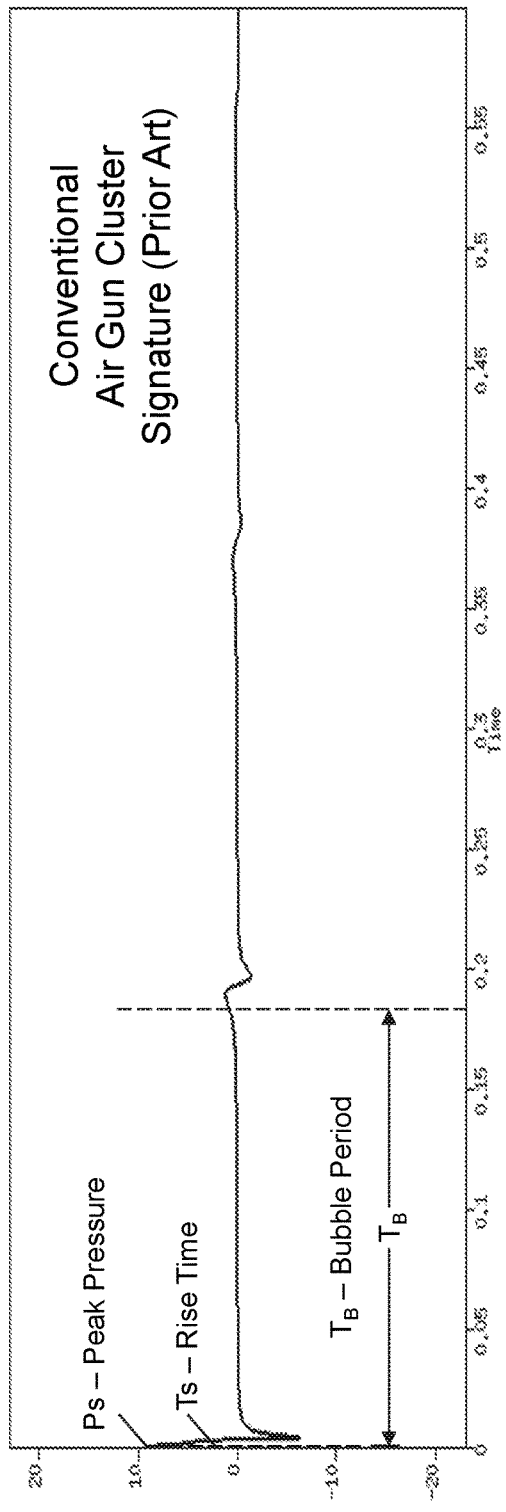
FIG. 10A is an embodiment of a signature from a conventional air gun cluster of the prior art.
FIG. 10B is an embodiment of signatures from the seismic source having multiple operating heads of the present invention with the first signature at a depth of 15 meters and the second signature at a depth of 7.5 meters.
Figure 10C:
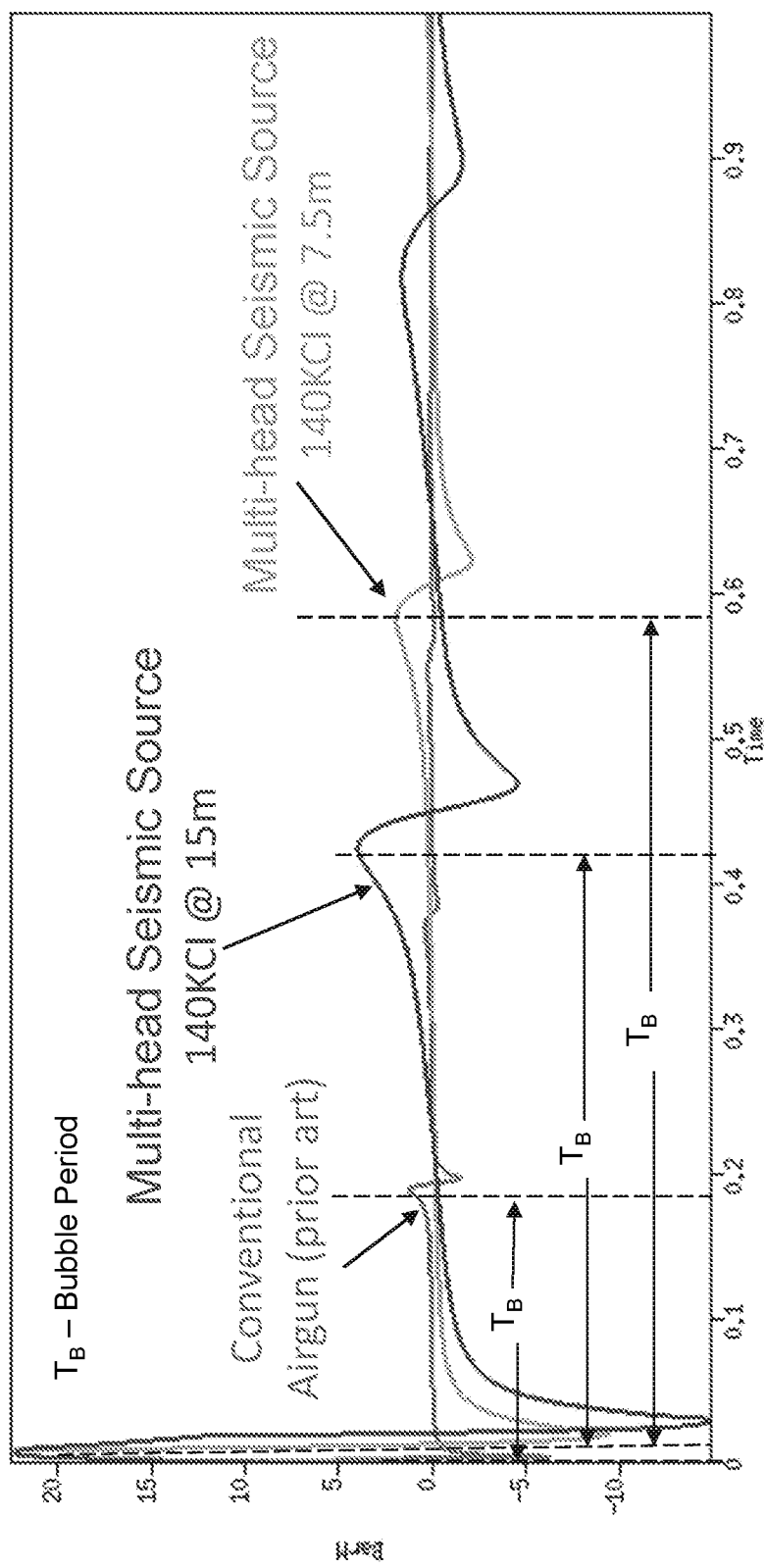
FIG. 10C is an embodiment of the signatures from the conventional air gun cluster of the prior art from FIG. 10A and the signatures from the seismic source having multiple operating heads of the present invention showing the first signature at a depth of 15 meters and the second signature at a depth of 7.5 meters from 10B.
Figure 11:
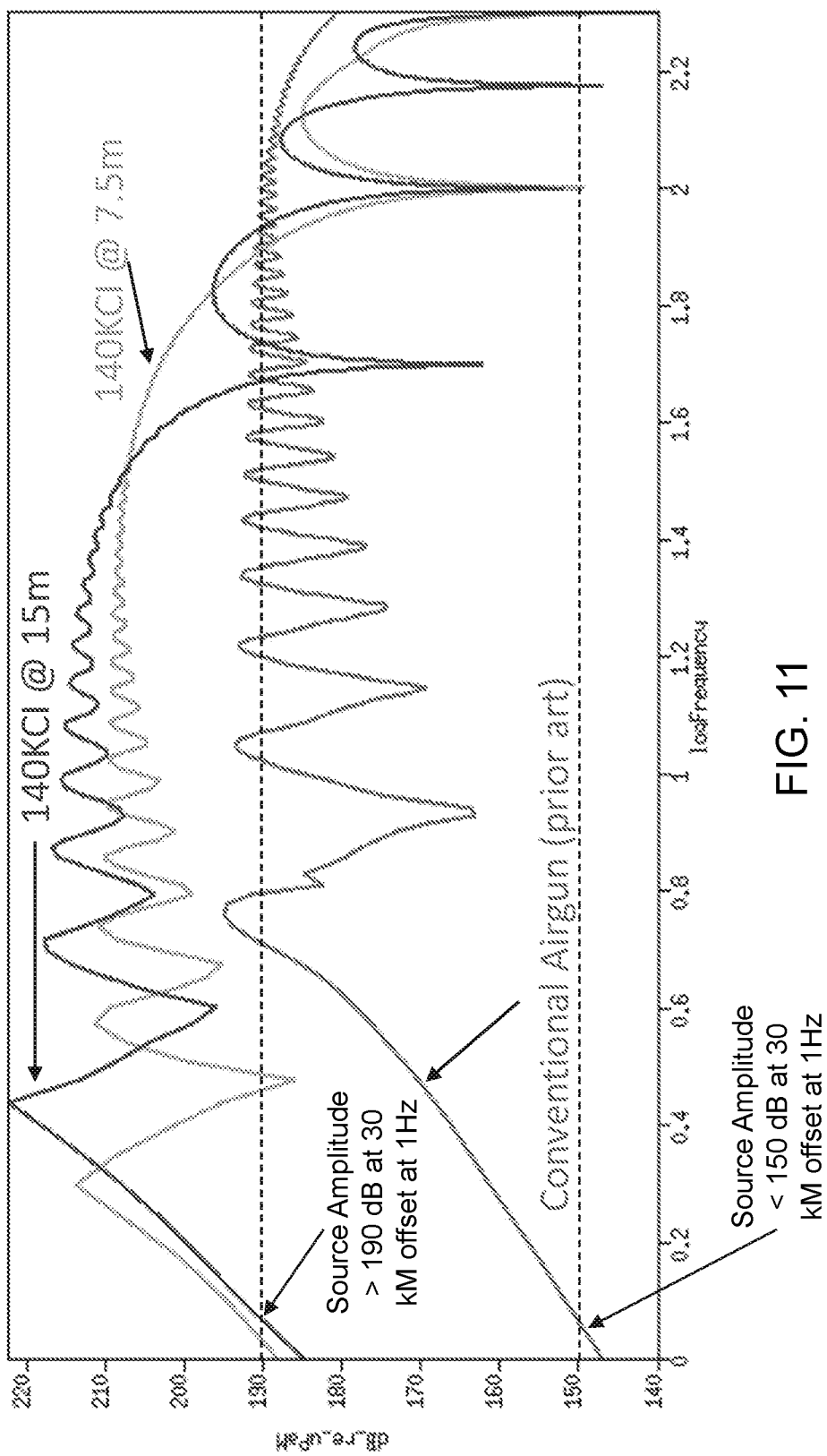
FIG. 11 is an embodiment of the spectra from the conventional air gun cluster of the prior art of FIG. 10A, and the spectrum from the first signature at a depth of 15 meters and the spectrum from the second signature at a depth of 7.5 meters from FIG. 10B from the seismic source having multiple operating heads of the present invention.

As shown in FIG. 9, the number of operating heads 12 and the dimensions of the pressure vessel 16 tune the seismic source 10 to produce a delayed rise time and extended bubble period. In this example, the first signature is the seismic source 10 with four operating heads 12 and a pressure vessel 16 that has a total volume of 80,000 cubic inches. The bubble period is roughly 400 milliseconds. The second signature is the seismic source 10 with five operating heads 12 and a pressure vessel 16 that has a total volume of 100,000 cubic inches. The bubble period is roughly 420 milliseconds. The third signature is the seismic source 10 with six operating heads 12 and a pressure vessel that has a total volume of 120,000 cubic inches. The bubble period is roughly 430 milliseconds. As shown in FIG. 10A, in a conventional air gun cluster of in this example three air guns with each having a volume of 350 cu. in. for a total volume of 1050 cu. in. and an operating pressure of 2000 psi, a peak sound pressure level of about 8 barM is produced with a rise time of around 1.5 milliseconds and a peak-to-bubble ratio of 8:1. The bubble period is roughly 0.18 seconds. As shown in FIG. 10B, for a seismic source 10 having seven operating heads 12 and a volume of 140,000 cu.in. at an operating pressure of 1000 psi, the peak sound pressure level is nearly tripled to about 22 barM, the rise time is 17 milliseconds, the peak-to-bubble ratio is lower at only 5:1, and the bubble period is roughly 0.43 seconds at a depth of 15 meters. At a depth of 7.5 meters, the bubble period is increased to 0.59 seconds. The signatures from the air gun cluster and the seismic source 10 having seven operating heads 12 are shown overlaid in FIG. 10C. The frequency spectrum shown on a logarithmic scale for the air gun cluster and the seismic source 10 having six operating heads 12 is shown in FIG. 11. For the air gun cluster, the amplitude measured at a 30-kilometer offset at 1 Hz is equal to zero on the logarithmic frequency scale is 150 decibels. For the seismic source 10 with seven operating heads 12 the source amplitude at 1 Hz is 190 decibels. As is known in the art, source amplitude of 190 decibels is required to have adequate signal strength and sufficient signal to noise ratio to discern the seismic pulse from ocean noise at frequencies as low as 1 Hz. The air gun cluster as shown does not provide adequate signal strength and produces frequencies on the low end of around 7 Hz where 10 Hz is 1 and 100 Hz is 2 on the logarithmic scale. In the overlay of the frequency spectrum from the air gun cluster and the seismic source 10 with seven operating heads 12 as shown in FIG. 11, there is a sharp drop in high frequencies in the seismic source 10 where the output pulse has much less high frequency content than produced by conventional air guns.

The low frequency content of a seismic source is dependent on the volume of water that is displaced. The oscillating bubble that causes the water displacement depends on the volume times the operating pressure of the seismic source 10 with multiple operating heads 12 or of any one source within an array. Experience from decades of using air guns shows that the low frequency limit for acceptable signal to noise at far offsets from the seismic source is one over twice the bubble period. The bubble period is determined by the volume and pressure of the source and the depth at which the source is deployed. The bubble period is given by the Rayleigh-Willis formula as follows where P and V are the pressure and volume and the depth is in meters. K is a constant which depends on the percent of the air that exits the seismic source from the firing chamber. If 75% of the air exits the source when fired, then K is 2.06 when P is in PSI and V is given in cubic inch. Therefore, to achieve a 1 Hz signal at far offsets, the bubble period must be 500 milliseconds.

$$\text{Bubble period} = \frac{K(PV)^{1/3}}{(10+\text{Depth})^{5/6}}$$

Figure 12A:
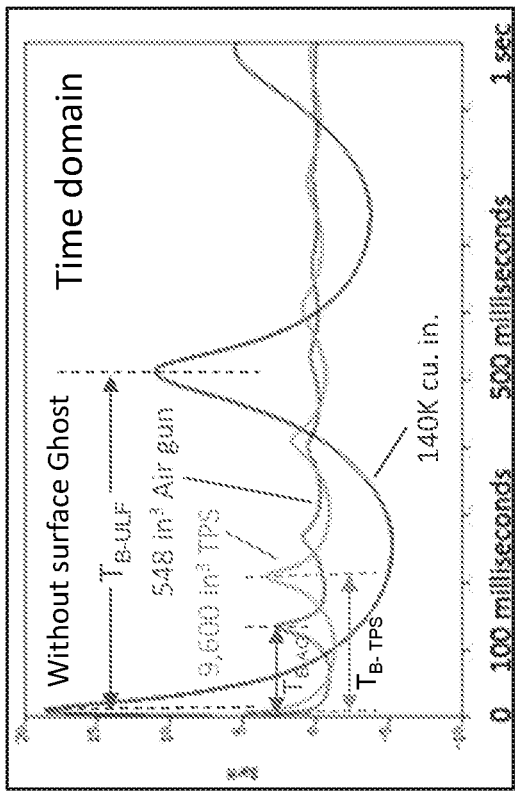
FIG. 12A is an embodiment of signatures with surface ghost for a single conventional air gun, a single tuned pulse source, and the seismic source having multiple operating heads of the present invention.
Figure 12B:
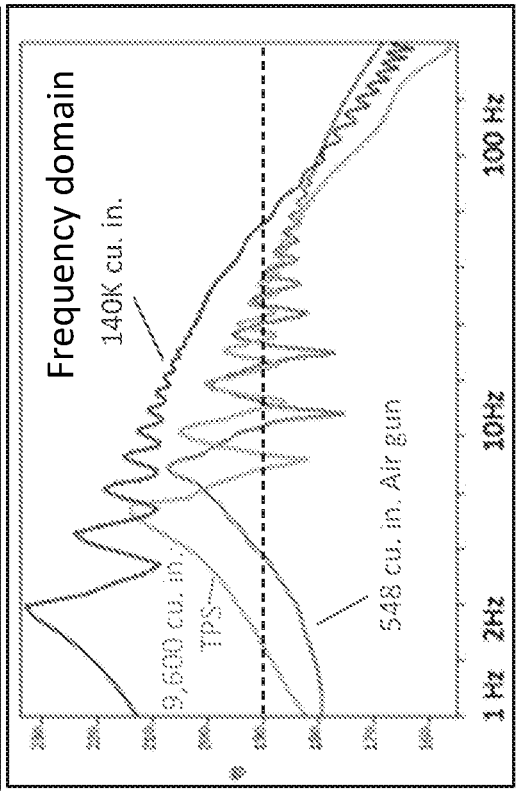
FIG. 12B is an embodiment of spectrum from the surface ghost signatures of FIG. 12A for the single conventional air gun, the single tuned pulse source, and the seismic source having multiple operating heads of the present invention.
Figure 12C:
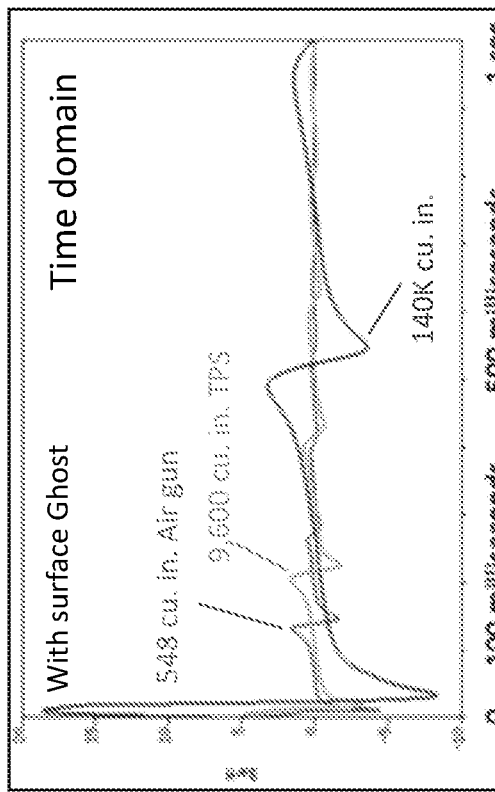
FIG. 12C is an embodiment of deghosted signatures from the signatures of FIG. 12A showing the bubble period at 30 km for a single conventional air gun, a single tuned pulse source, and the seismic source having multiple operating heads of the present invention.
Figure 12D:
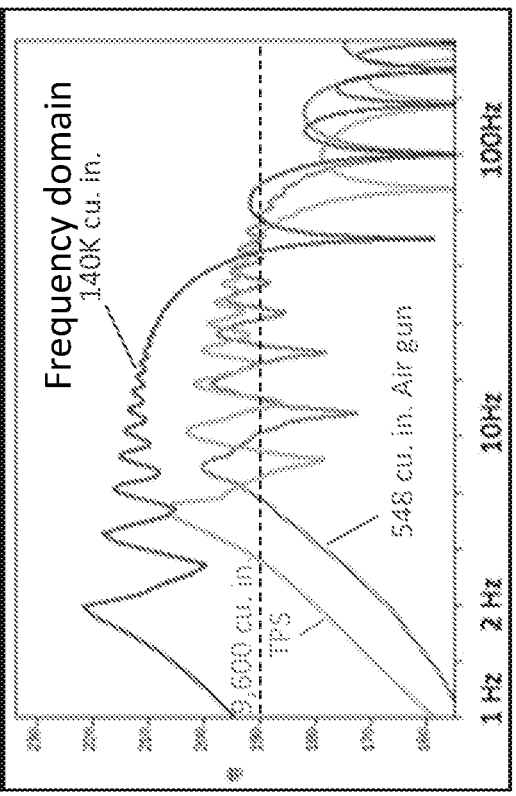
FIG. 12D is an embodiment of spectrum from the deghosted signatures from FIG. 12C for the single conventional air gun, the single tuned pulse source, and the seismic source having multiple operating heads of the present invention.

Using the Rayleigh-Willis formula, and limiting the pressure to 1000 psi which is in the range of operating pressures for the seismic source 10 with multiple operating heads 12 of the present invention, a volume of 140,000 cu. in. is required to achieve a bubble period of 500 milliseconds and signal at 1 Hz in 30 km offset. As shown in FIG. 12A, using computer modeling and the Rayleigh-Willis formula, signatures at different volumes are constructed for a conventional air gun of the prior art having a volume of 40 cu. in., a TPS having a volume of 9600 cu. in. and the seismic source 10 of the present invention with seven operating heads 12 and a volume of 140,000 cu. in. shown with the surface ghost in each signature. The frequency spectrum for the conventional air gun having a volume of 40 cu. in., the TPS having a volume of 9600 cu. in. and the seismic source 10 of the present invention with seven operating heads 12 and a volume of 140,000 cu. in. are shown in FIG. 12B. The frequency spectrum shows the source amplitude at greater than 190 decibels at 1 Hz for the 140,000 cu. in. in volume seismic source 10 of the present invention. The source amplitude at 1 Hz for the 40 cu. in. in volume conventional air gun and for the 9600 cu. in. in volume TPS is less than 160 decibels. In FIG. 12C, the deghosted signatures for the 40 cu. in. in volume air gun, the 9600 cu. in. in volume TPS, and for the 140,000 cu. in. in volume seismic source 10 of the present invention are shown. In FIG. 12D, the frequency spectrum for the deghosted signatures show the source amplitude for the seismic source 10 of the present invention having a volume of 140,000 cu. in. at greater than 210 decibels at 1 Hz. For the 40 cu. in. in volume conventional air gun and for the 9600 cu. in. in volume TPS the source amplitude is at less than 180 decibels at 1 Hz.

Figure 13A:
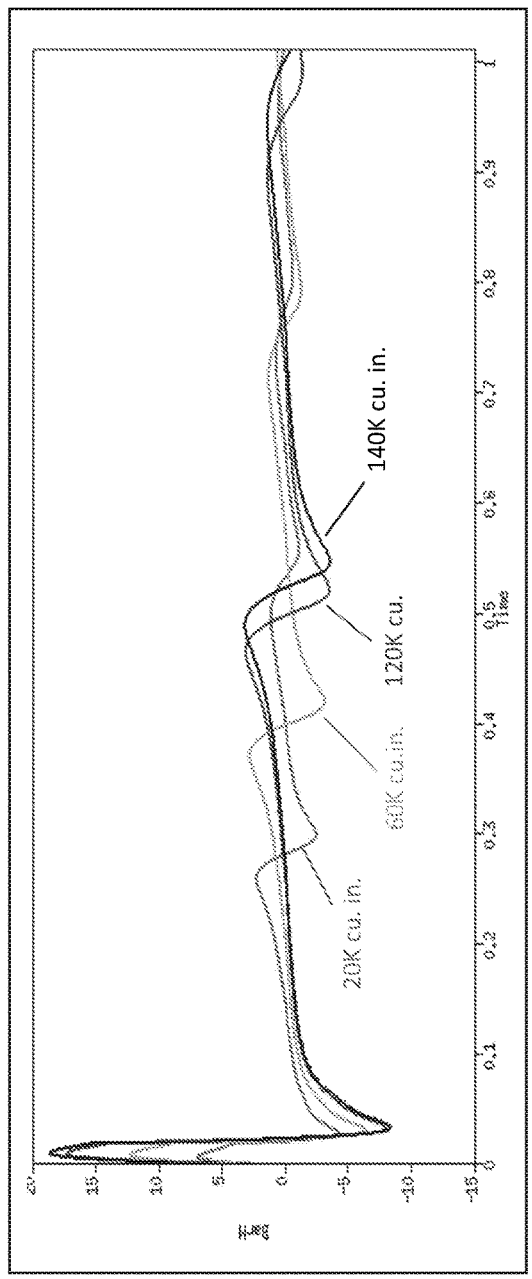
FIG. 13A is an embodiment of signatures with surface ghost for a single 1×20,000 in$^3$ tuned pulse source, and from a 60,000 in$^3$, a 120,000 in$^3$, and a 140,000 in$^3$ seismic source of the present invention with each having multiple operating heads.
Figure 13B:
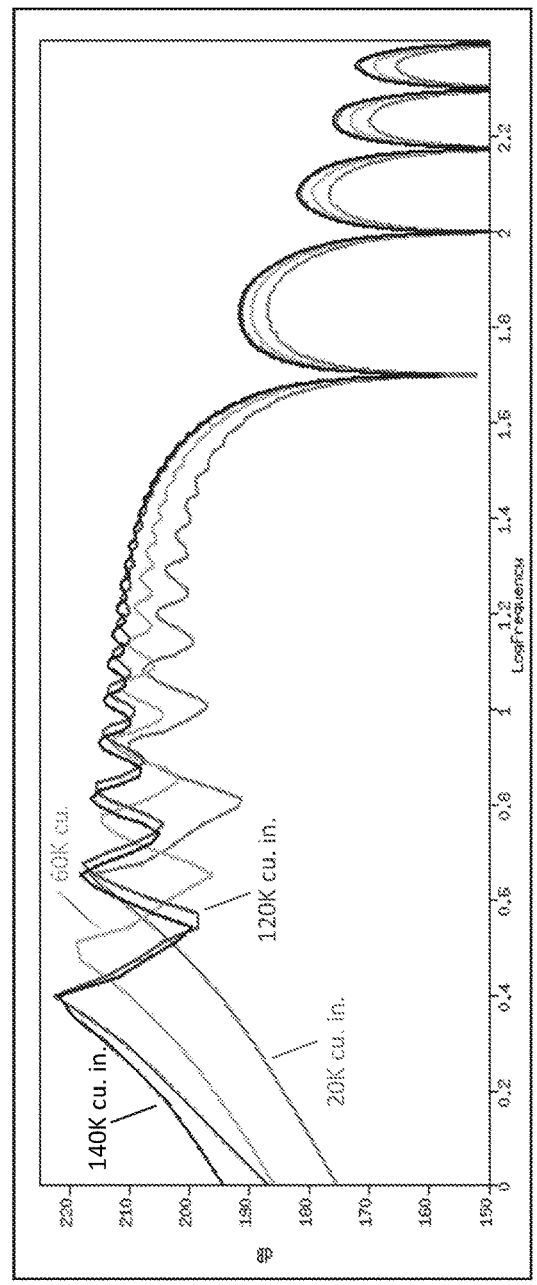
FIG. 13B is an embodiment of spectrum from the surface ghost signatures of FIG. 13A for the single 1×20,000 in$^3$ tuned pulse source, and the 60,000 in$^3$, the 120,000 in$^3$, and the 140,000 in$^3$ seismic source of the present invention with each having multiple operating heads.

As shown in FIG. 13A, using computer modeling and the Rayleigh-Willis formula, signatures at different volumes are constructed for the seismic source 10 having multiple operating heads 12 and for a tuned pulse source (TPS) that is 20,000 cu.in. in volume. As shown the rise time remains substantially constant while the peak sound pressure level and bubble period increase as the number of operating heads 12 are increased. The increase in peak sound pressure level using more operating heads 12 means a larger energy output from the single seismic source 10 of the present invention than from a cluster. The energy output of the single 20,000 cu. in. in volume TPS using the Carnot Formula and dependent on the depth of deployment is estimated at 15 meters to be 3.5 Megajoules and at 30 meters to be 3.1 Megajoules. For the 140,000 cu. in. in volume seismic source 10 with seven operating heads, the energy output at 15 meters is estimated to be 25 Megajoules and at 30 meters to be 22 Megajoules. As shown in FIG. 13B in the frequency spectrum from the signatures of FIG. 13A, the increased energy output by using more operating heads increases the source amplitude from a single 20,000 cu.in. in volume TPS that is less than 180 decibels at 1 Hz to over 190 decibels for the seismic source having a volume of 140,000 cu. in. and seven operating heads. As is known within a seismic source array any number of clusters with each cluster having a different number of sources are selected to meet the signal output characteristics and frequency content based on the environment, deployment depth and other requirements of the seismic survey. In the present invention as is shown, a seismic source having three operating heads and a volume of 60,000 cu. in. has a source amplitude of about 185 decibels at 1 Hz while a seismic source having six operating heads and a volume of 120,000 cu. in. has a source amplitude of about 187 decibels at 1 Hz and over 190 decibels in the 2 Hz to 3 Hz range which may be the frequency range of interest for some seismic surveys. What is not known in the prior art is a seismic source having multiple operating heads that can achieve source amplitudes that are over 190 decibels at 1 Hz which can be done with the seismic source 10 of the present invention.

Figure 14A:
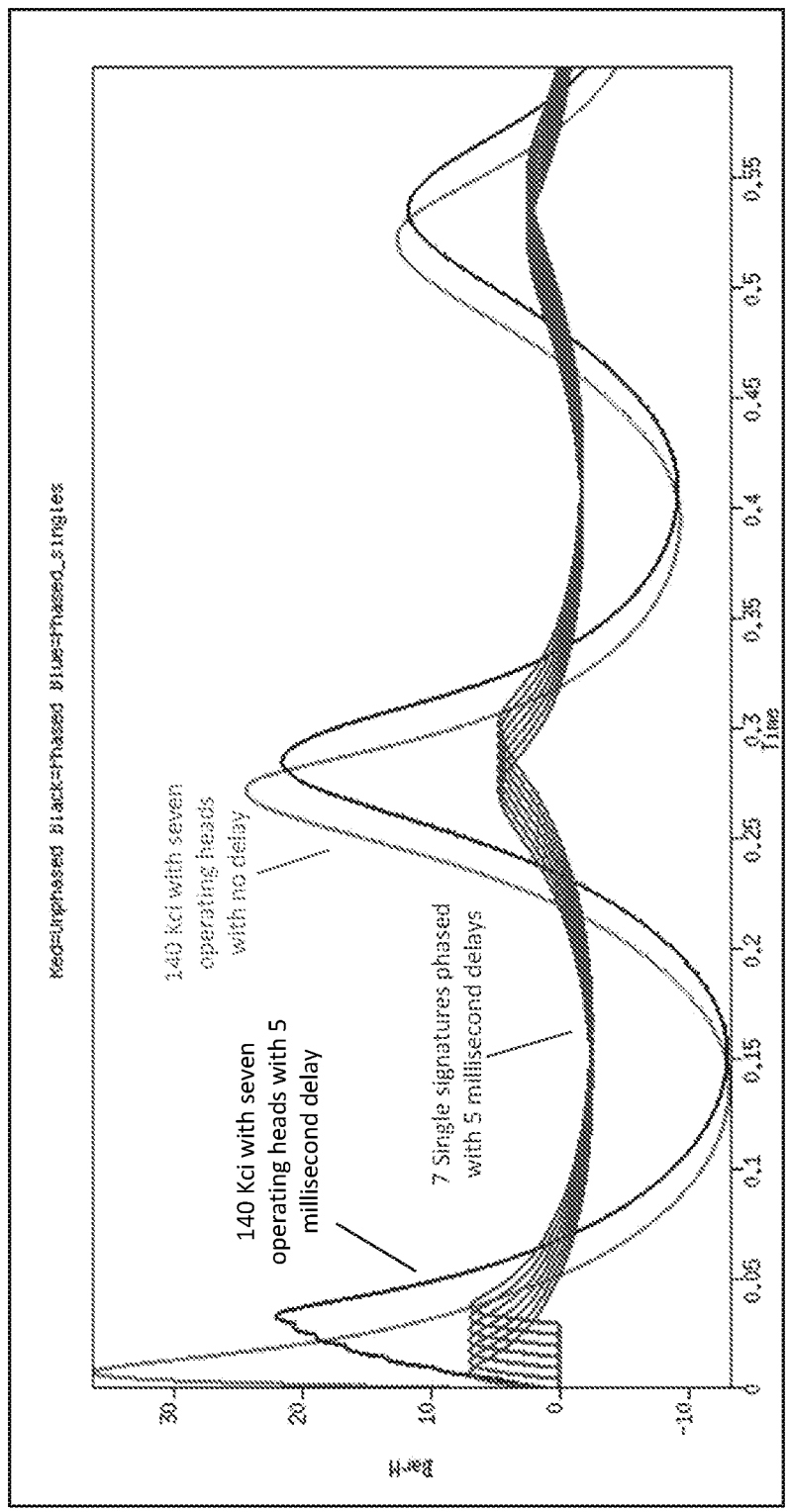
FIG. 14A is an embodiment of combined signatures of simultaneous firing of the operating heads of the seismic source of the present invention, of combined phased signatures of firing each operating head in secession with a 5-millisecond time delay, and a separate signature from each operating head fired with the 5-millisecond time delay in an embodiment of the seismic source having multiple operating heads of the present invention.
Figure 14B:
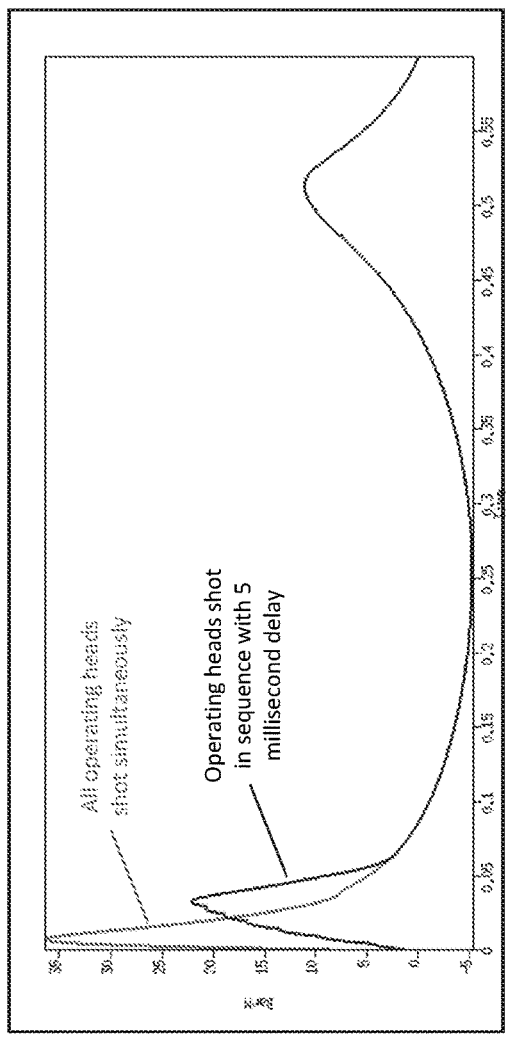
FIG. 14B is an embodiment of the combined signatures of simultaneous firing all of the operating heads of the seismic source having multiple operating heads of the present invention and the combined phased signatures of firing each operating head in secession with a 5-millisecond time delay of FIG. 14A.
Figure 14C:
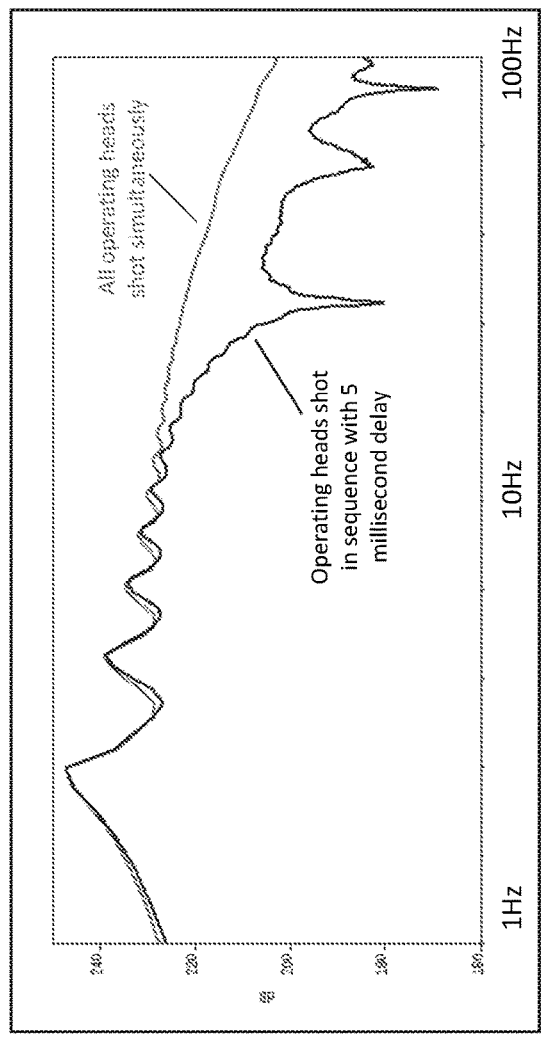
FIG. 14C is an embodiment of the spectrum from the combined signatures of simultaneous firing of all of the operating heads of the seismic source having multiple operating heads of the present invention and the combined phased signatures of firing each operating head in secession with a 5-millisecond time delay of FIG. 14A.

In embodiments of the present invention, the operating heads 12 of the seismic source 10 may be fired simultaneously or in order to broaden out the signal, a 5 to 10 millisecond delay in firing each operating head 12 is implemented using a firing control program. As shown in FIG. 14A, the combined signature of firing all of the operating heads 12 of the seismic source 10 simultaneously is shown. Also shown are the signal signatures from firing each operating head 12 consecutively with a 5-millisecond delay and the combined signature of these delayed signatures is also shown. The combined signature of the simultaneous firing of the operating heads 12 may be referred to as the "unphased signal" where a peak sound pressure level of 36 BarM and a rise time of 20 milliseconds is shown. The combined signature for the delayed firing of the operating heads, the "phased signal" has a peak sound pressure level of 23 BarM and a rise time of 40 milliseconds broadening out the output signal and thereby reducing high frequencies. While there does not appear to be an increase in low frequency content by using delayed firing, the rise time is increased, the peak sound pressure level is reduced, the slope is reduced, and there is less environmental impact with the reduction in high frequencies. As shown in the example generated through computer modeling in FIGS. 14B and 14C, the rise time increases by a factor of 4, the peak sound pressure level decreases by a factor of 40%, the slope decreases by a factor of 8 and the high frequency content above 10 Hz reduces by over 20 decibels. Therefore, by adding phased firing to the firing of the operating heads 12 of the seismic source 10 of the present invention, the characteristics of the signal output may be adjusted. Further, by selecting a specific order to the firing of the operating heads 12, the rise time and slope may be increased while decreasing high frequency content as desired.

In embodiments of the seismic source 10 a specific firing order of the operating heads 12 with a delay of for example 5-milliseconds may be added between each firing with a first operating head 12 being fired, then a second operating head 12 that is across or not adjacent to the first operating head 12 and at the furthest distance from the first operating head 12 is fired, then a third operating head 12 that is across and at the furthest distance from the second operating head 12 is fired, then a fourth operating head 12 that is across from and at the furthest distance from the third operating head 12 is fired, a fifth operating head 12 that is across and at the furthest distance from the fourth operating head 12 is fired, a sixth operating head 12 that is across and at the furthest distance from the fifth operating head 12 is fired and then finally a seventh operating head 12 that is across and at the furthest distance from the sixth operating head 12 is fired. While firing a sequence of the operating heads 12 and then simultaneously firing all operating heads 12 together is known and sometimes referred to as "Pop-Corn" firing, what is not known in the prior art is firing multiple operating heads 12 at different times and in a specific order from a single seismic source 10 using one firing chamber 14 to characterize the signal output. The seismic source 10 and firing circuitry of the present invention provides this unique benefit to enhance the signal output and improve the signal quality over specific clusters within an array of conventional air guns.

Various configurations of operating heads 12 and pressure vessels 16 for the firing chamber 14 having different diameters and volumes are within the scope of the present invention and therefore the number, configuration, and dimensions of the operating heads 12 and firing chamber 14 may be selected as desired. For example, the firing chamber 14 may have twice the diameter and be shorter to reduce the overall length of the seismic source 10 while still achieving for example the desired volume of 140,000 cu. in. to reach the required source amplitude of 190 decibels at 1 Hz. In other embodiments, the number of operating heads 12 and the diameter and length of the firing chamber 14 may be selected to tune the seismic source 12 to a specific frequency content and signal output having the desired signal characteristics for the rise time and slope as required by the seismic survey with any structural design or configuration of the number of operating heads 12 and dimensions of the firing chamber 14 for the seismic source 10 being within the scope of the present invention.

Although specific embodiments of the invention have been disclosed herein in detail, it is to be understood that this is for purposes of illustration. This disclosure is not to be construed as limiting the scope of the invention, since the described embodiments may be changed in details as will become apparent to those skilled in the art in order to adapt the seismic source having multiple operating heads to particular applications, without departing from the scope of the following claims and equivalents of the claimed elements.

What is claimed is:

1. A seismic source for marine exploration comprising:
   a single firing chamber having a curved head, the single firing chamber extending along an axis and being configured to store compressed air;
   at least two operating heads attached externally to the curved head of the single firing chamber and each configured to fluidly communicate with the single firing chamber to receive the compressed air, the at least two operating heads extending along the axis, each having (1) discharge ports open at one end to an ambient and (2) a shuttle assembly configured to seal the single firing chamber; and
   a control module configured to fire the seismic source by releasing a seal of the shuttle assembly and discharging the compressed air from the single firing chamber to form an oscillating bubble seismic pulse from the release of air from the discharge ports of each of the at least two operating heads,
   wherein the at least two operating heads extend away from the curved head of the single firing chamber, along a same direction of the axis.

2. The seismic source for marine exploration of claim 1 wherein the at least two operating heads comprising divider posts between the discharge ports; and
   wherein the divider posts are of unequal dimensions to form discharge ports of different dimensions.

3. The seismic source for marine exploration of claim 2 wherein the dimensions of the divider posts facing the axis of the firing chamber are larger in dimensions than the divider posts facing away from the axis of the firing chamber to form larger discharge ports facing away from the axis of the firing chamber than the discharge ports facing the axis of the firing chamber.

4. The seismic source for marine exploration of claim 1 comprising:
   a hub positioned along the axis of the firing chamber; and
   spokes attached to the hub and extending between the at least two operating heads, the spokes configured to prevent the operating heads from separating or stressfully vibrating when the seismic source is fired.

5. The seismic source for marine exploration of claim 1 comprising a conduit pipe extending through the length of the firing chamber, the conduit pipe configured for conducting at least one electrical control cable and at least one air supply hose.

6. The seismic source for marine exploration of claim 5 comprising at least one external terminal connector positioned at an end of the conduit pipe, the at least one external terminal connector configured for connection of at least one electrical cable from an exploration ship to the at least one electrical control cable of the conduit pipe.

7. The seismic source for marine exploration of claim 5 comprising at least one external air supply connector positioned at an end of the conduit pipe, the at least one external air supply configured for connection of at least one air supply hose from an exploration ship to the at least one air supply hose of the conduit pipe.

8. The seismic source for marine exploration of claim 5 wherein the control module comprising an electrical distribution terminal configured to connect the control module to an electrical cable from the conduit pipe and to distribute power to the firing circuit of each of the at least two operating heads.

9. The seismic source for marine exploration of claim 5 wherein the control module comprising a pneumatic distribution module configured to connect the control module to an air supply hose from the conduit pipe and to distribute air separately to each of the at least two operating heads and distribute air separately to the firing chamber.

10. The seismic source for marine exploration of claim 1 wherein the control module comprising a magazine configured for locating a firing circuit and solenoid valves for each of the at least two operating heads.

11. The seismic source for marine exploration of claim 10 wherein the magazine comprising cavities for canisters located at a radius around a center line of the magazine, the canisters configured for housing the firing circuits and solenoid valves for each of the at least two operating heads.

12. The seismic source for marine exploration of claim 1 wherein the control module comprising a communications module configured for monitoring and transmitting data comprising the timepoint of firing each of the at least two operating heads.

13. The seismic source for marine exploration of claim 12 wherein the communications module configured for monitoring and transmitting data comprising at least one of readings from pressure sensors, temperature sensors, and hydrophone sensors.

14. The seismic source for marine exploration of claim 1 wherein the control module configured to seal each of shuttle assemblies of the at least two operating heads to the firing chamber simultaneously.

15. The seismic source for marine exploration of claim 1 comprising a vent configured to release compressed air from the firing chamber; and
wherein the control module configured to vent the compressed air from the firing chamber while keeping compressed air within the operating heads at a pressure higher than the pressure within the firing chamber.

16. The seismic source for marine exploration of claim 1 wherein the control module is configured to fire all of the at least two operating heads simultaneously.

17. The seismic source for marine exploration of claim 1 wherein the control module configured to fire all or some of the at least two operating heads sequentially triggered at predetermined intervals.

18. The seismic source for marine exploration of claim 1 wherein the number of operating heads and the length, diameter and volume of the firing chamber may be selected to tune the characteristics of the seismic pulse.

19. The seismic source for marine exploration of claim 1 comprising the operation of the seismic sources using a firing sequence to have all or some of the operating heads fire at different points in time.

20. The seismic source for marine exploration of claim 1 wherein the firing sequence has a time delay of between 1 and 50 milliseconds between the firing of each operating head of the seismic source in the order of the firing sequence.

21. A seismic source for marine exploration comprising:
a single firing chamber extending along an axis and configured to store compressed air;
at least two operating heads attached externally to the single firing chamber and each configured to fluidly communicate with the single firing chamber to receive the compressed air, the at least two operating heads each having (1) discharge ports open at one end to an ambient and (2) a shuttle assembly configured to seal the firing chamber, each of the two at least two operating heads extending along the axis, on a same side of the single firing chamber;
a control module configured to fire the seismic source by releasing a seal of the shuttle assembly and discharging the compressed air from the single firing chamber to form an oscillating bubble seismic pulse from the release of air from the discharge ports of each of the at least two operating heads,
wherein the control module is centrally located along the axis, which is a center axis of the single firing chamber, between the at least two operating heads, and outside the single firing chamber, and
wherein the at least two operating heads are radially spaced from a center point around which a tubular housing holds the control module.

22. A seismic source for marine exploration comprising:
a firing chamber configured to store compressed air;
at least two operating heads, each having (1) discharge ports open at one end to an ambient, and (2) a shuttle assembly configured to seal the firing chamber; and
a control module configured to fire the seismic source by releasing a seal of the shuttle assembly and discharging the compressed air from the firing chamber to form an oscillating bubble seismic pulse from the release of air from the discharge ports of each of the at least two operating heads,
wherein the control module is configured to fill each of the at least two operating heads with compressed air prior to filling the firing chamber with compressed air.

* * * * *